United States Patent
Katamoto et al.

(10) Patent No.: US 6,202,162 B1
(45) Date of Patent: Mar. 13, 2001

(54) DATA PROCESSING SYSTEM HAVING SEPARABLE DATA-PROCESSING DEVICES AND A DEACTIVABLE POWER-SAVING FUNCTION

(75) Inventors: Koji Katamoto, Yamatokoriyama; Hideo Matsuda, Nara; Yoshitaka Honda, Nara; Tamotsu Fukushima, Nara; Hiranaga Yamamoto, Nara; Syoichiro Yoshiura, Tenri; Kenichi Gomi, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/201,364

(22) Filed: Nov. 30, 1998

(30) Foreign Application Priority Data

Dec. 19, 1997 (JP) .................................................. 9-350604

(51) Int. Cl.⁷ ............................... G06F 1/32; G06F 13/00
(52) U.S. Cl. ............................................ 713/320; 713/323
(58) Field of Search .................................... 709/200, 201, 709/202, 213, 217, 231; 713/320, 323, 340; 710/101, 100; 370/311, 402

(56) References Cited

U.S. PATENT DOCUMENTS

| | | | |
|---|---|---|---|
| 5,003,578 | * | 3/1991 | Lin . |
| 5,404,544 | * | 4/1995 | Crayford . |
| 5,467,202 | | 11/1995 | Washio et al. ........................ 358/448 |
| 5,642,517 | * | 6/1997 | Shirota . |
| 5,752,049 | * | 5/1998 | Lee . |

FOREIGN PATENT DOCUMENTS

| | | |
|---|---|---|
| 26451 | 7/1983 | (JP) . |
| 63-89125 | 6/1988 | (JP) . |
| 2-6451 | 2/1990 | (JP) . |
| 04195509 | 7/1992 | (JP) . |
| 05145673 | 6/1993 | (JP) . |

\* cited by examiner

Primary Examiner—Gopal C. Ray
(74) Attorney, Agent, or Firm—Renner, Otto, Boisselle & Sklar LLP

(57) ABSTRACT

A data-processing system consisting of a portable terminal device and a copying machine can effectively work with protection against breakage of data stored in the terminal device. The data-processing system is constructed to work on the following principle: When a given period is measured by a timer for starting the power saving mode, a portable terminal device provides a copying machine with a signal informing of starting the power-saving mode. The copying machine, which received the power-saving-mode starting signal, provides in later the portable terminal device a signal requiring the terminal to cancel the power-saving-mode. When a given period is measured by a timer for starting the power saving mode, the copying machine provides the portable terminal device with a signal requiring the terminal device to start the power-saving mode. A CPU, which received information on request of power-saving-mode, executes the power saving mode. The portable terminal device and the copying machine as the former being mounted on the latter can simultaneously execute the power saving mode, preliminarily sheltering data in the storage.

6 Claims, 34 Drawing Sheets

FIG.14
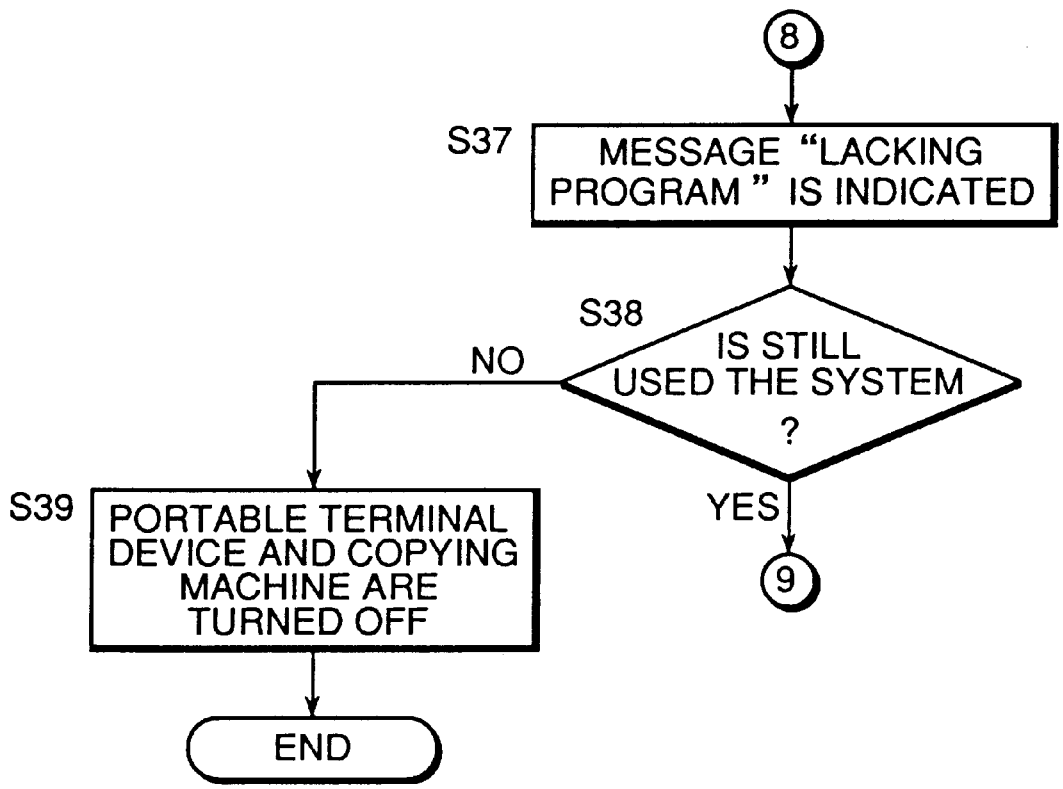
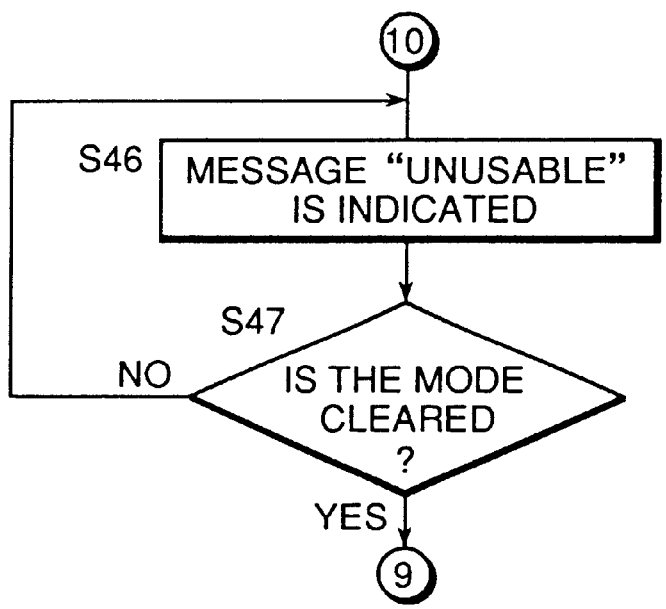

FIG.25
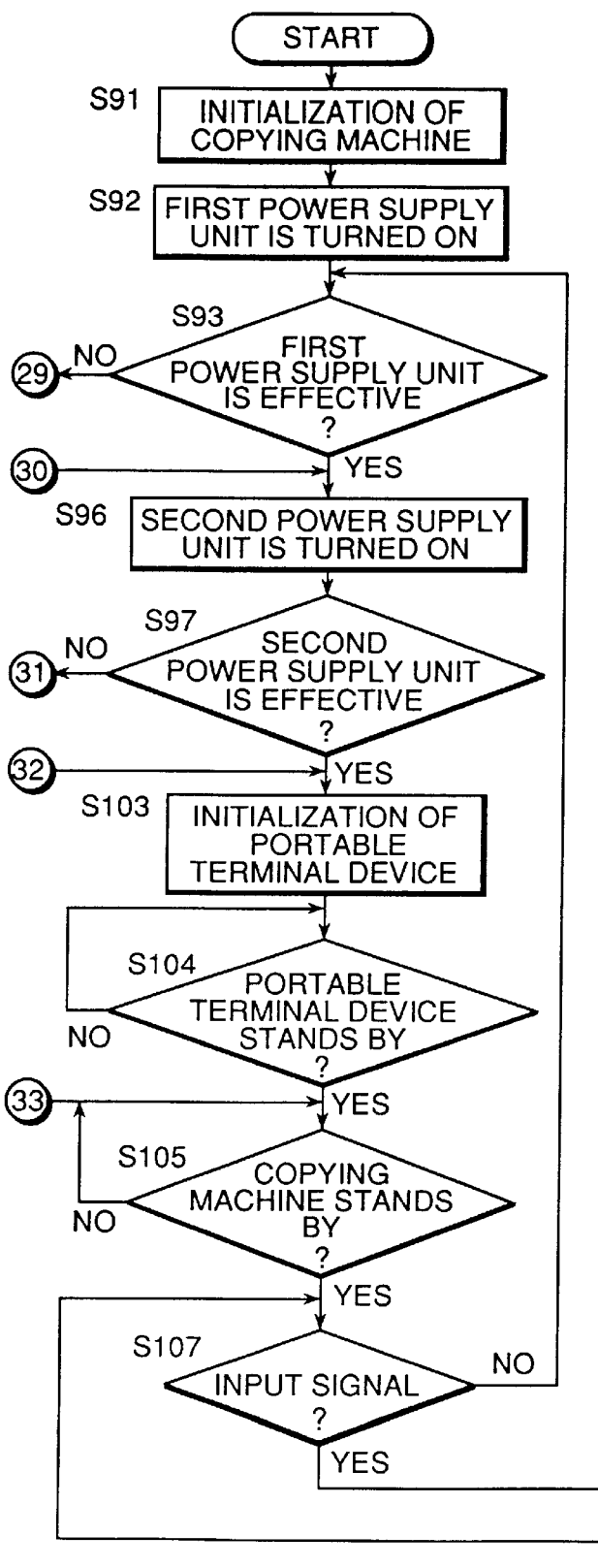
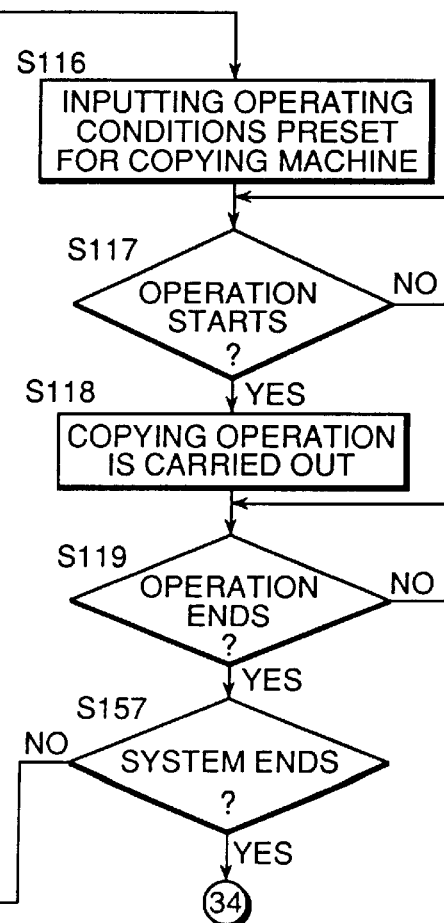

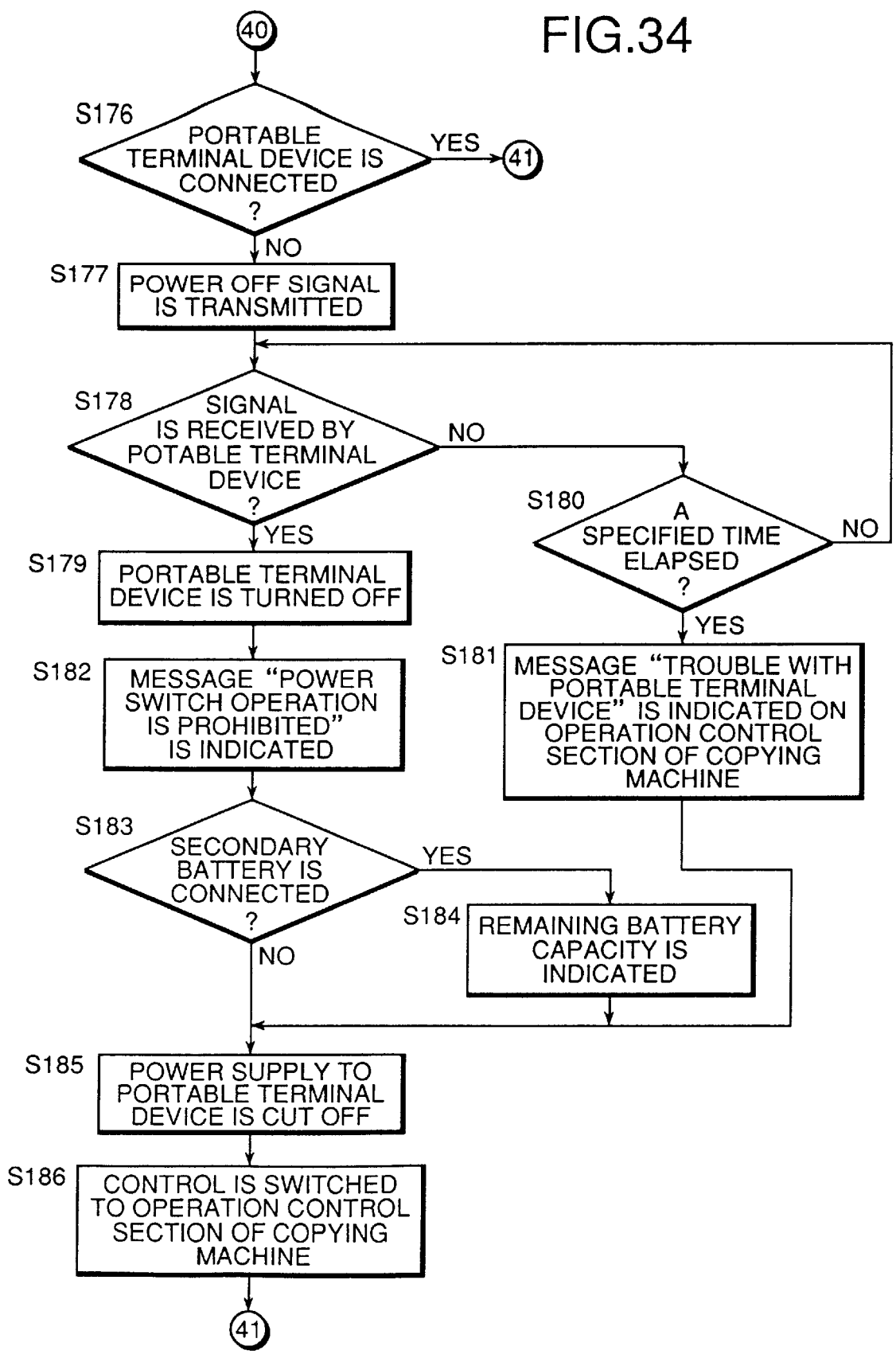

DATA PROCESSING SYSTEM HAVING SEPARABLE DATA-PROCESSING DEVICES AND A DEACTIVABLE POWER-SAVING FUNCTION

BACKGROUND OF THE INVENTION

The present invention relates to a data processing system in which a first data-processing device such as a portable terminal unit can be attached to a second data-processing device so that the first data-processing device is used as a part of an operating section of the second data-processing device, and more particularly, to a data processing system wherein the second data-processing device can stably supply the first data-processing device with a stabilized power in the controlled state.

A known example of a second data-processing device for executing data-processing operation according to processing data input through an operating section is a digital color copying machine that performs specified processing operations on data of an original color image input through an image-inputting unit such as a scanner, then outputs the original color image reproduced according to the processed image data through the color printer section.

Japanese Laid-Open Patent Publication No. 5-145673 discloses a data-processing system for a digital color copying machine, which system allows the copying machine to work by processing data according to parameters preset and input from the second operating means such as an external universal personal computer or the like. Furthermore, Japanese Utility Model Publication No. 2-6451 discloses a copying machine that has a removable operating portion and works according to the operation mode and data preset in the operating portion.

Till now, there been thus proposed data-processing systems each consisting of two separate data-processing devices, one (the second) of which performs data-processing operation according to processing data (operating mode data) input from the other (first) device. The first device, which is an external device to the second device, may be a so-called mobile computer.

However, the conventional image processing systems have no consideration of power supply problem for first and second data-processing devices from the view point of saving in power consumption and protecting data in the first data-processing device. Particularly, a data-processing system in which the first data-processing device is a portable terminal operating always on its inner battery for transmitting the data to the second data-processing device, cannot operate for a long time due to the battery capacity of the first device.

An attempt to solve the above problem by supplying power from the second data-processing device to the portable terminal arises another problem that data stored in the terminal may be broken by unintentional disconnection between the data-processing device and the terminal due to unmatched stating and ending procedures at both devices.

SUMMARY OF THE INVENTION

An object of the present invention is to provide a data-processing system composed of the first data-processing device such as a portable terminal and the second data-processing device working as connected with the first device, which system allows the second data-processing device to conduct the control of transmission of data from and to the first data-processing device as well as the control of power supply to the first data-processing device which may be thus used with no fear of no power supply and losing data stored therein.

Another object of the present invention is to provide a data processing system for transmitting data between a first data-processing device for accepting operation of inputting processing data and a second data-processing device for executing processing according to the input processing data, which is featured in that the first data-processing device is provided with a power saving function for disconnecting a power supply when input waiting time of the first data-processing device exceeds a specified time and a function for inactivating the power saving function while the first and second data-processing devices are coupled with each other.

In the above data-processing system, the first data-processing device connected with the second data-processing device cannot be deenergized by a power-saving function effected when the first data-processing device did not receive an input signal within a predetermined period. Therefore, this system can reliably work with no fear of sudden interruption of power supply to the first data-processing device.

Another object of the present invention is to provide a data processing system, wherein the first data-processing device stores a plurality of programs relating the operation of inputting data for processing and a part of the programs is inhibited to execute while the first and second data-processing devices are connected with each other.

This system can thus work without applying any excessive load of programs to the second data-processing device by inhibiting to drive unnecessary programs stored in the first data-processing device during the connection being maintained between the first and second devices.

Another object of the present invention is to provide a data processing system, wherein the second data-processing device is provided with a single or plural inputting members having functions common to the processing-data inputting members of the first data-processing device and operations of the common-function inputting member(s) of either of both devices are allowed while the first and second data-processing devices are connected with each other.

The above data-processing system composed of the first and second data-processing devices can selectively use ones of the common-function inputting members, eliminating the possibility of excessive data inputting by the same functions of both devices.

Another object of the present invention is to provide a data processing system, wherein the first data-processing device is provided with an internal power supply source, the second data-processing device is provided with a plurality of power supply portions, and the first data-processing device is supplied with power from either of the internal power supply or any one of plural power supply portions based upon the detected state of the first data-processing device.

In the above data-processing system, the first data-processing device is supplied with electric power from either its internal power-supply source or a power-supply source of the second data-processing device, which source is selectable in view of the current condition of the power supply of the second data-processing device. Namely, the first data-processing device can be powered suitably from the adapted power supply source.

An another object of the present invention is to provide a data processing system, wherein the first data-processing device is provided with a rechargeable internal power-supply source that is recharged from the power supply portion of the second data-processing device while the first and second data-processing devices are connected with each other.

In the above data-processing system, the inner battery of the first data-processing device can be charged from the power supply source of the second data-processing device. This enables the first data-processing device to work separately while the system operates with the second data-processing device only.

An another object of the present invention is to provide a data processing system, wherein the second data-processing device can detect a state of connection between the first and second data-processing devices and provides the first data-processing device with a signal for switching off the power supply when the connection is removed.

In the above data-processing system composed of the first and second data-processing device, the first data-processing device executes the power supply switching-off procedure according to an instruction from the second data-processing device every time when the first data-processing device is disconnected from the second data-processing device. This eliminates the possibility of causing the first data-processing device to accept the data inputting operation whenever incorrect or insufficient connection arises between the first and second data-processing devices.

BRIEF DESCRIPTION OF DRAWINGS

FIGS. 12, 13 and 14 are flow charts depicting the third example of a processing procedure of a control section to control a copying machine and a terminal device in a data-processing system embodying the present invention.

FIGS. 25, 26 and 27 are flow charts depicting the seventh example of a processing procedure of a control section to control a copying machine and a terminal device in a data-processing system embodying the present invention.

FIGS. 33 and 34 are continuation of the flow charts of FIGS. 30, 31 and 32.

PREFERRED EMBODIMENT OF THE INVENTION

A preferred embodiment of the present invention will be described by way of example as a data processing system comprising a portable terminal device serving as the first data-processing device and a digital color copying machine (referred hereinafter to as "copying machine") serving as the second data-processing device. It is of course possible to use other various kinds of devices as the first and second data-processing devices on the condition that they can transmit and receive processing data from and to each other.

Figure 1:
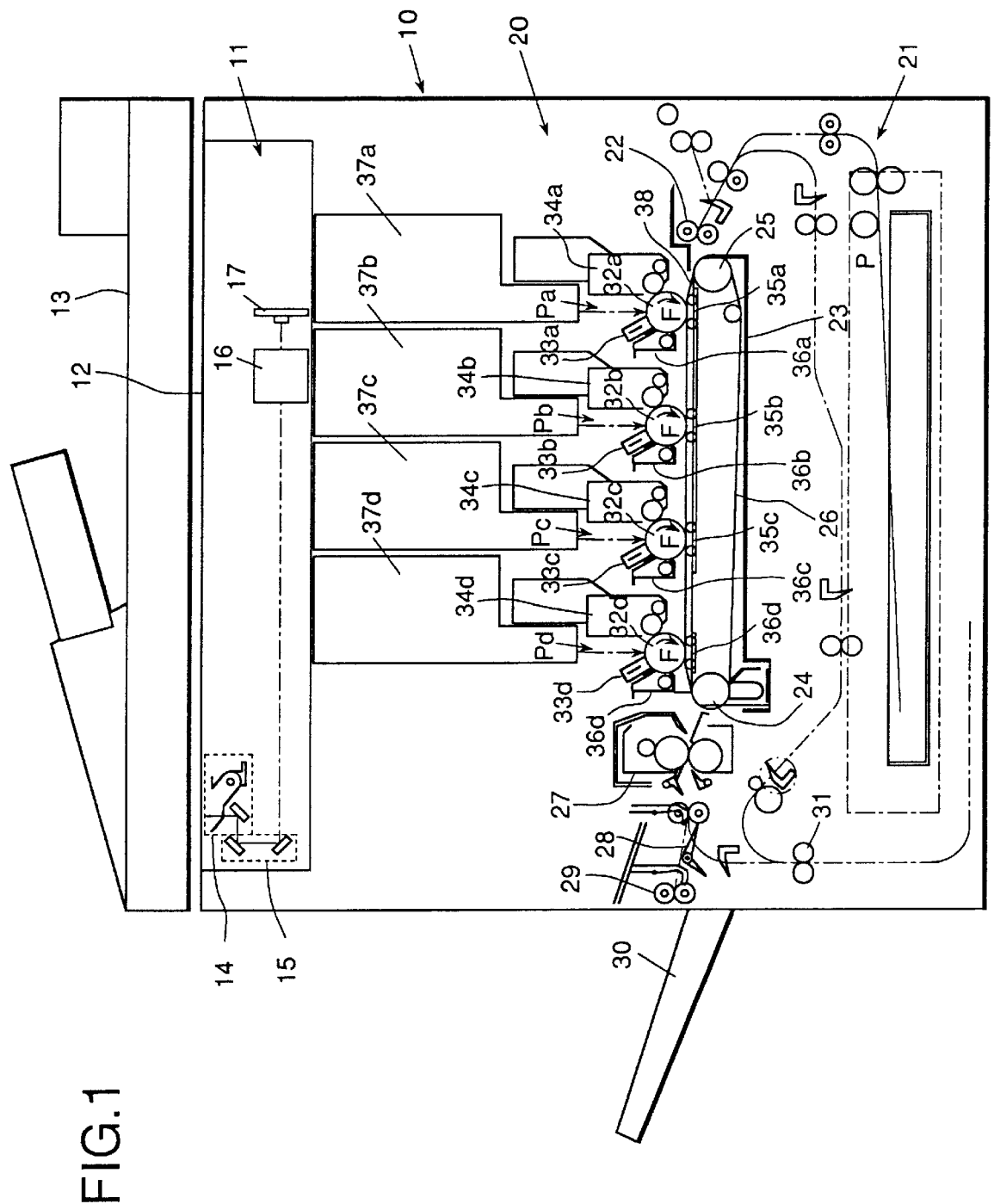
FIG. 1 is a construction view of a copying machine constituting a data-processing system embodying the present invention.

FIG. 1 is a construction view of a copying machine composing a data processing system according to the present invention. The copying machine 10 has a document plate 12 and an operation panel (not shown) at its top. The top of the copying machine 10 is covered with an automatic document feeder 13 that can be swung up. The copying machine 10 incorporates an image reading section 11, an image forming section 20 and a paper feeding section 21.

It is assumed that the automatic document feeder 13 can feed one of several originals printed on its both sides and piled thereon to the document plate and turn over it. In other words, each original printed on its both sides is automatically transported along the top of the document plate 12 to be read from its one side and then turned over and transported along the document plate to be read from the other side. The original having been read from its both sides is then discharged and a subsequent original is automatically fed to the document plate. The feeding operation of the document feeder 13 is controlled as a part of the general sequential operation of the copying machine 10.

The image reading section 11 is provided with a first scanning unit 14 including an exposure lamp and a mirror, a second scanning unit 15 with a mirror mounted thereon, an optical lens 16 and a photoelectric conversion element 17. The first and second scanning units 14 and 15 move under the document plate in parallel thereto and scan the opposing surface of the original with light from the exposure lamp, directing light reflected from the original to the optical lens 16. The reflected light of the original image through the optical lens 16 enters the photoelectric conversion element 17 which in turn outputs an electric signal corresponding to the received original image light.

The recording paper feeding section 31 separates a sheet of recording paper from the top of a paper pile in a cassette and feeds it toward the image forming section 20. The paper fed from the paper feeding section 21 stops abutting at its front edge on resist roller 22 that then rotates in synchronism with the movement of the image forming section 20 to transfer the paper thereto. Under the image forming section, there is disposed a belt conveyer mechanism 23 that comprises an endless transporting belt 26 mounted on a driving roller 24 and a driven roller 25. The belt 26 is electrostatically charged by a charging brush and transports the paper by attracting the paper to its charged surface.

The image forming section 20 has image-forming stations Pa–Pd (No. 1 to No. 4). The first image-forming station Pa comprises a light-sensitive drum 32a supported rotatably in the direction indicated by an arrow F, an electrostatic charger 33a for charging the surface of the light-sensitive drum 32a with a single polarity charge, a laser unit 37a for transfer the imaging light onto the light-sensitive surface of the light-sensitive drum 32a, a developing device for developing with toner a latent image formed on the surface of the light-sensitive drum 32a, an image-transfer unit 35a for transfer the developed toner image from the drum surface onto the paper and a cleaner 36a for cleaning off remaining toner from the drum surface. Remaining stations Pb to Pd have the same construction as the first image-forming station Pa.

The image-forming stations Pa–Pd (No. 1–4) correspond to yellow color, magenta color, cyan color and black color respectively. Namely, image signals output from the respective photoelectric conversion elements 17 are sent to an image processing section (to be described later) whereby they are processed into yellow, magenta, cyan and black color images and then transferred to the laser units 37a–37d respectively.

Each of the laser units 37a–37d is composed of a semiconductor laser element emitting laser light corresponding to image data, a polygonal mirror for deflecting laser light in the main scanning direction and a fθ-optical lens for forming a deflected light image on the light-sensitive drum. The laser units 37a–37d transfer respective color (yellow, magenta, cyan and black) images to corresponding light-sensitive drums 32a–32d.

The image-developing devices 34a–34d contain yellow color toner, magenta color toner, cyan color toner and black color toner respectively and can develop respective color images with respective color toners on the corresponding light-sensitive drums.

The image forming stations Pa–Pd transfer respective color images onto the paper being transferred by the transporting belt 26. In the copying machine 10, there is a toner image fixing device 27 disposed at the downstream side of the belt conveyer mechanism 23. The paper carrying thereon a developed color image is heated, being pressed against the fixing device 27 while passing therethrough. Thus, inks of the toner image are fused on the paper by heat. The paper with a fixed color image thereon is then guided by the selecting operation of a gate 28 to a delivery roller 29 or a switchback path 31. Namely, the paper having a fixed image on its one side or both sides is discharged on a copy tray by the delivery roller 29 in the single-side printing mode or both-sides printing mode. On the other hand, the paper printed on its one side in the both-sides printing mode is led to the switchback path 31, turned over thereon and transferred again to the image forming section 20.

Figure 2:
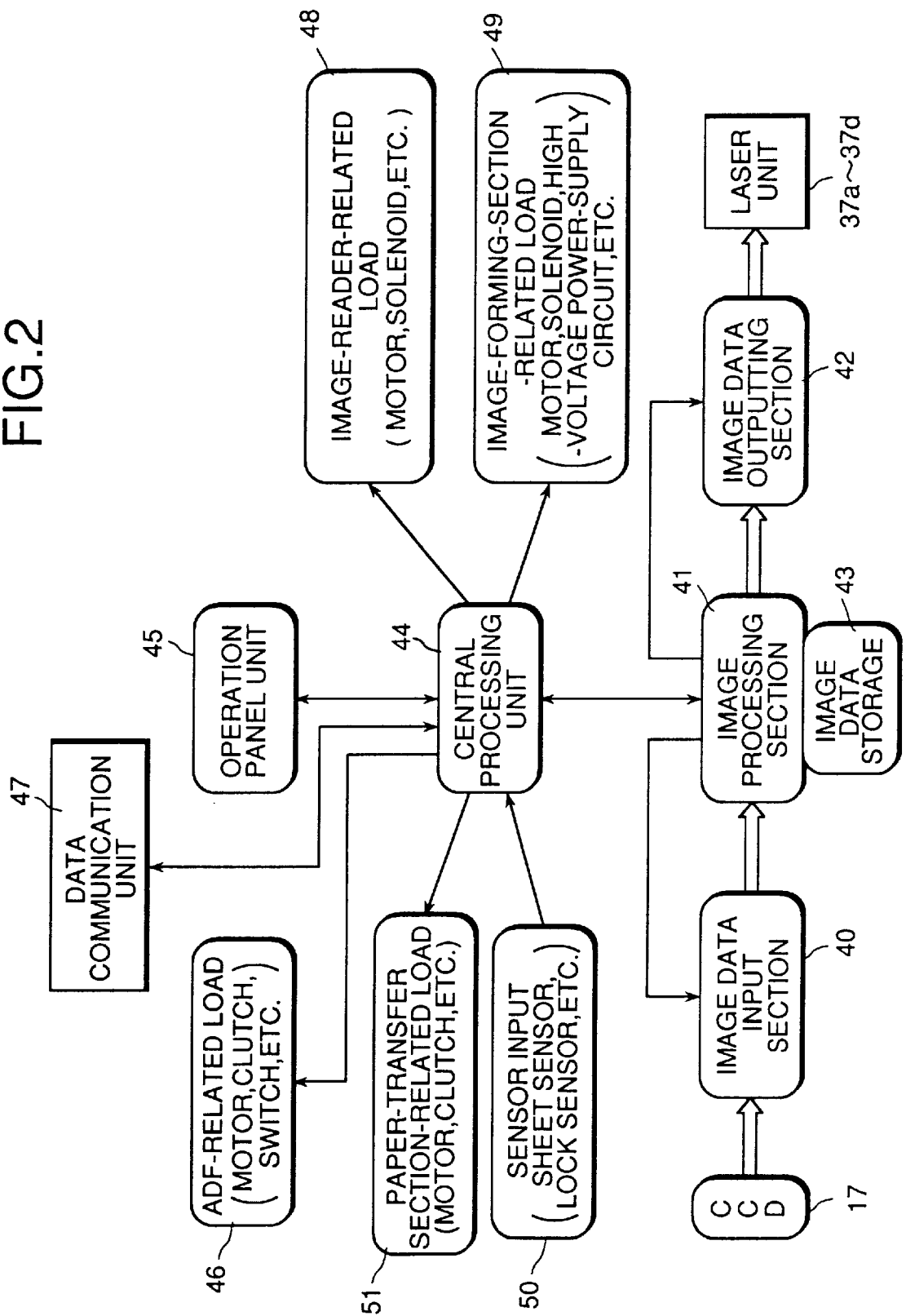
FIG. 2 is a block diagram of a control section of the copying machine.

FIG. 2 is a block diagram showing the construction of a control section of the copying machine 10. The operation of the respective sections of the copying machine 10 is controlled from a central processing unit 44 to which, therefore, an image-processing section 41, an operation panel 45, an automatic document feeder (ADF)-related load 46, a data communication unit 47, an image-reading section-related load 48, an image-forming section-related load 49, a sensor input section 50 and a paper-transfer section-related load 51.

The ADF-related load 46 includes a motor, a clutch and a switch necessary for the ADF to transfer a document. The image-reading-section-related load 48 includes motors and solenoids necessary for operating scanning units 14 and 15 of the image reading section 11. The image-forming-section-related load 49 includes motors, solenoids and high-voltage supply circuits necessary for rotation of the light-sensitive drums 32a–32d. The paper-transfer-section-related load 51 includes motors and clutches necessary for rotating paper-feeding rollers, resist rollers 22, a transporting belt 26 and delivery rollers 29, which compose a paper transporting path from the paper feeding section 21 to the product tray 30 through the image forming section 20.

The image processing section 41 is connected with an image data input section 41, an image data output section 42 and an image storage sec tion 43. The image processing section 41 receives an image signal from the photoelectric conversion element 17 of the image reading section, converts the signal into digital data by the image data input section 40 and stores the data in the image data storage section 43, then outputs the data through the image data output section 42 to the laser units 37a–37d of the image forming section 20.

The sensor input section 50 is connected to a plurality of paper sensors arranged along the paper transporting path from the paper feeding section 21 to the product tray 30 through the image forming section 20 and lock sensors for sensing the open or closed state of respective sections of the copying machine 10. The sensor input section 50 inputs detection signals of these sensors to the central processing unit 44.

The operation panel unit 45 includes key-switches and a display composing an operation panel disposed on the top of the copying machine 10. The operation panel unit 45 receives image processing data inputted by manipulating key-switches, outputs the received data to the central processing unit 44 and displays data input from the central processing unit 44.

The data communication unit 47 is connected to a portable terminal device to be described later. The central processing unit 44 through the data communication unit 47 accepts image data and image processing data from the portable terminal device. It also outputs displaying data and control data to the portable terminal device through the data communication unit 47.

According to operation of the operation panel 45 or image-processing data received through the data communication unit 47 and detection signals from the sensor input section 50, the central processing unit 44 outputs control data to the image-processing section 41, the ADF-related load 46, the image-reading-section-related load 48, the image-forming-section-related load 49 and the paper-transporting-section-related load 51. The central processing unit 44 also outputs displaying data to the operation panel 45 and displaying data and control data to the portable terminal device through the data communication unit 47.

Figure 3A:
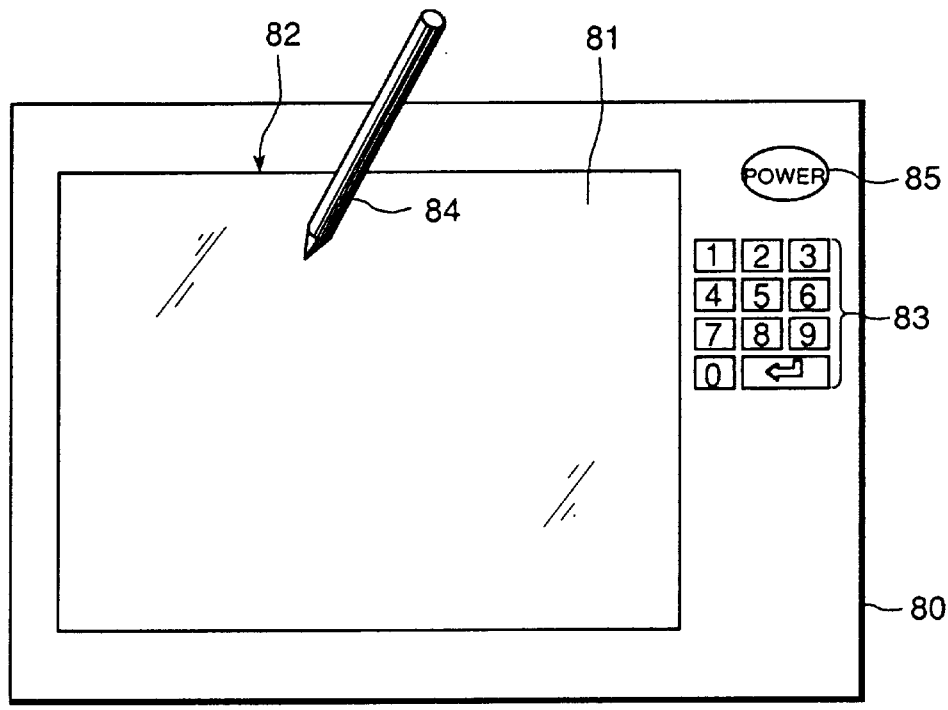
FIGS. 3A and 3B are illustrative in front and rear respectively of a terminal device composing a data processing system according to the present invention.
Figure 3B:
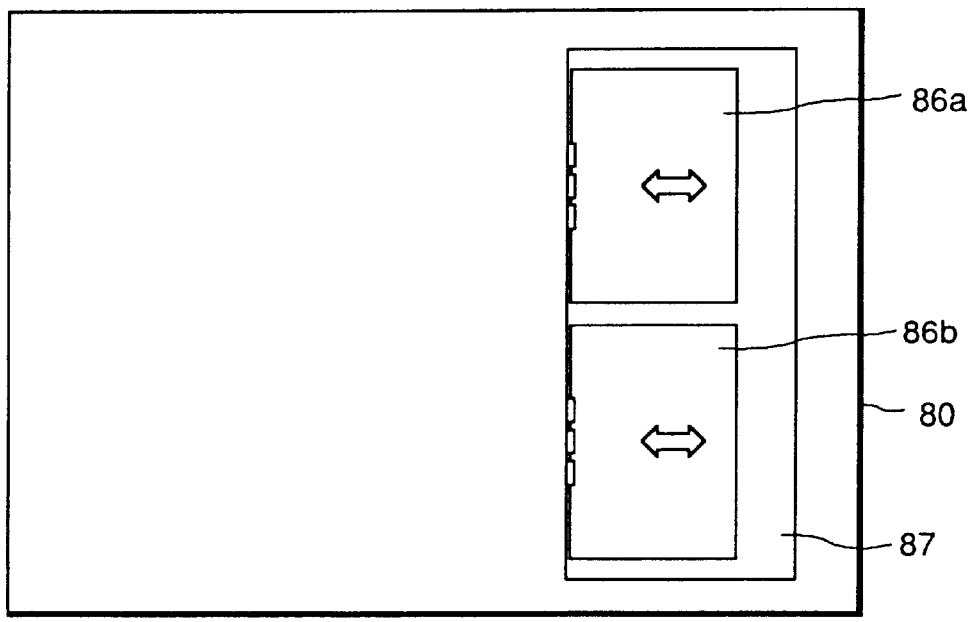

FIGS. 3A and 3B are front and rear views respectively of a portable terminal device composing the data processing system. The portable terminal device 80 is a so-called mobile computer that is provided at its front side with a color display having a transparent touch panel, a power supply switch 85 and a set of numeral and function keys 83 and has a battery magazine 87 formed at its rear side for mounting rechargeable batteries 86a and 86b. The portable terminal device 80 is powered by the batteries 86a and 86b mounted in the battery magazine 87. It can also be supplied with electric power through an AC adapter (not shown) connected to an available external power source. The portable terminal device 80 is thin enough to be attached to a portion of the operation panel of the copying machine 10 as described later. Data can be inputted into this device by manipulating an input pen 84 on the touch panel 81 or manipulating the keys 83.

Figure 4:
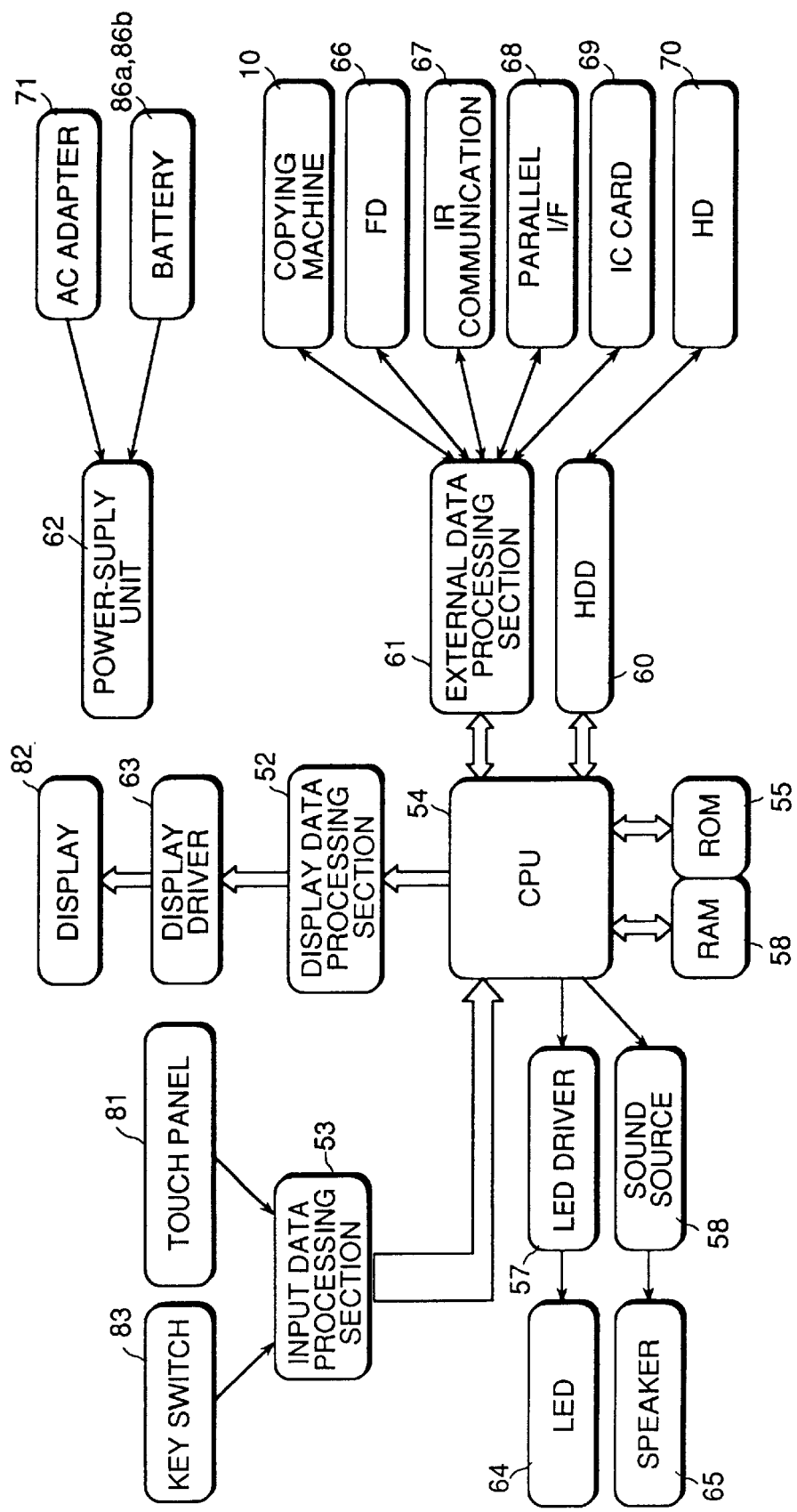
FIG. 4 is a block diagram of a control section of the terminal device.

FIG. 4 is a block diagram showing a control section of the portable terminal device, which section consists of a CPU 54 connected with a read-only memory (ROM) 55 and a random access memory (RAM) 56 for centralized control of respective sections of the portable terminal device. Namely, a display-data processing section 52, input-data processing section 53, an LED driver 57 a sound source unit 58, an HDD driver 60, an external data-processing section 61 and a power supply section 62 are all connected to the CPU 54.

The display data processing section 52 develops display data outputted from the CPU 54 and transfers the developed data to a display driver 63 which in turn drives a color display 82 according to the data received therefrom. The input data processing section 53 receives data inputted through the numeral keys 83 and/or the touch panel 81 and transfers the data to the CPU 54. The LED driver 57 lights an LED (Light-Emitting Diode) 64 for showing the working state of the portable terminal device 80 according to the drive data outputted from the CPU 54.

The sound source unit 58 emits a sound signal indicating the working state of the portable terminal device through a speaker 65 according to sound data from the CPU 54. The HD driver 60 conducts writing/reading of input data/output data in and from a hard disk (HD) 70 for storing input data and output data of the portable terminal device 80. The external data processing section 61 writes and reads data on a memory medium such as a floppy disk 66 and an IC card 69. This external data processing section 61 also inputs data from an external device and outputs data thereto through an IR communicating portion 67 or a parallel interface 68. The portable terminal device 80 through the external data processing section 61 also sends and receives data to and from the copying machine 10 composing the data processing system. The power supply unit 62 supplies electric current to respective components of the portable terminal device by means of the rechargeable batteries 86a and 86b or the AC adapter 71 connected to an external power supply source.

Figure 5:
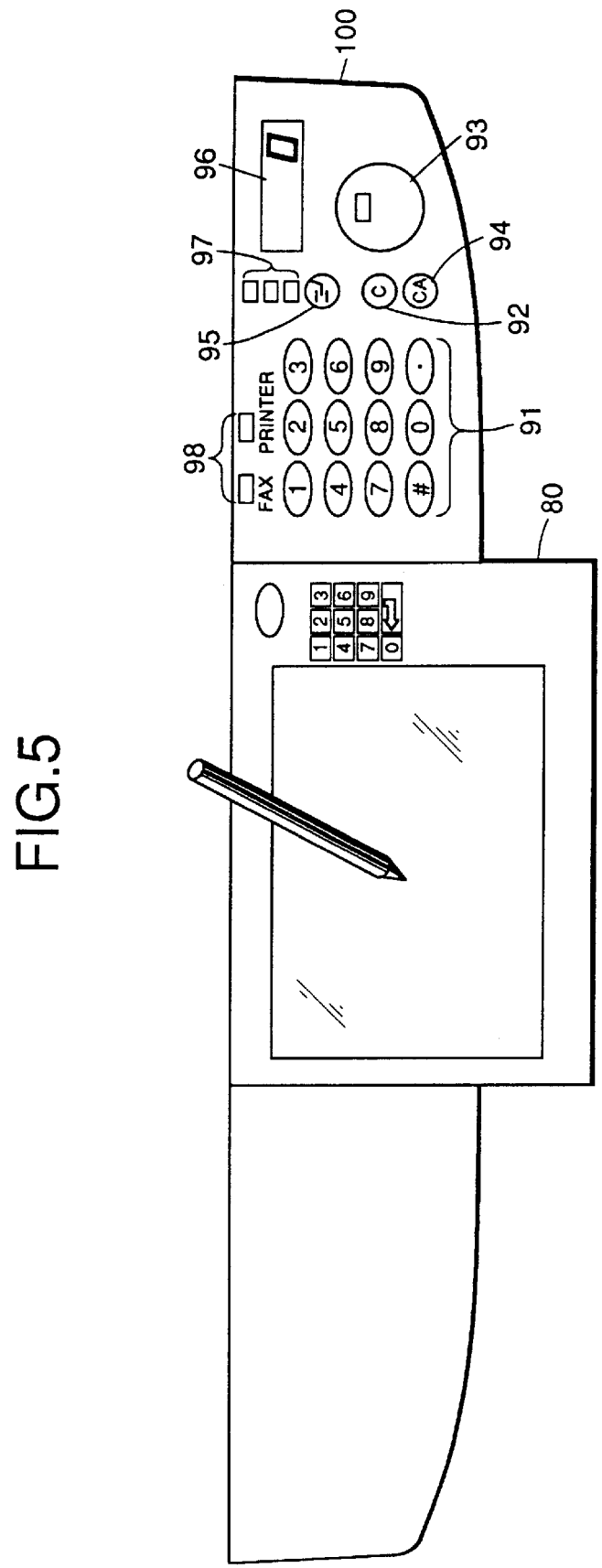
FIG. 5 is illustrative of an operation panel of a copying machine with the terminal device mounted thereon.

FIG. 5 is illustrative of an operation panel of the copying machine, to which the above portable terminal device is attached. The operation panel 100 disposed on the top surface of the copying machine 10 is provided with numeral keys 91 for inputting the preset number of copies, a "clear" key 92 for inputting a signal for clearing the preset number of copies or interrupting the continuous copying operation, a "start" key 93 for inputting a command for starting the copying operation, a "cancel" key 94 for inputting a command for clearing all processing data set at that time, an "interrupt" key 95 for accepting an interruption for another copying action during the continuous copying operation, an indicator 96 for indicating the preset number of copies, a state indicator 97 for indicating states of the copying machine such as ON/OFF of the power supply and the preheating mode of the machine and function indicators 98 for indicating the execution of a facsimile function and a printer function. The portable terminal device 80 is removably mounted on the center portion of the above operation panel 100.

Figure 6A:
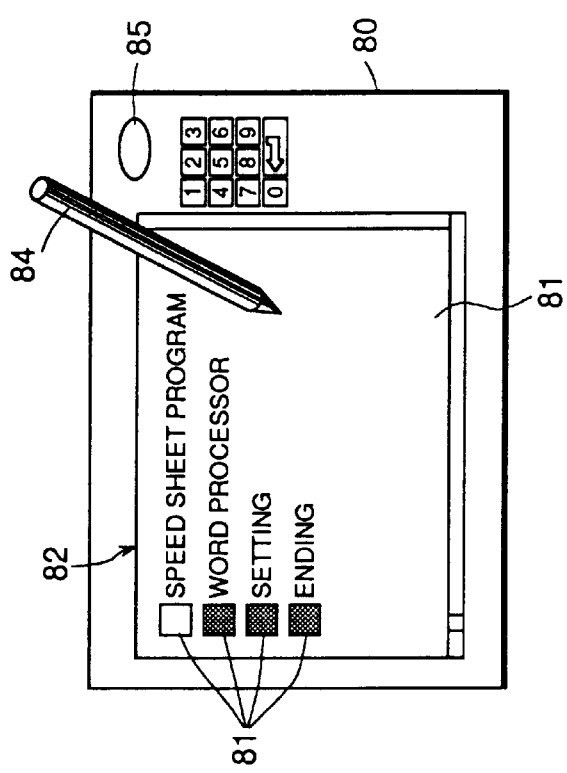
FIGS. 6A and 6B show a display screen of a display unit of the terminal device.
Figure 6B:
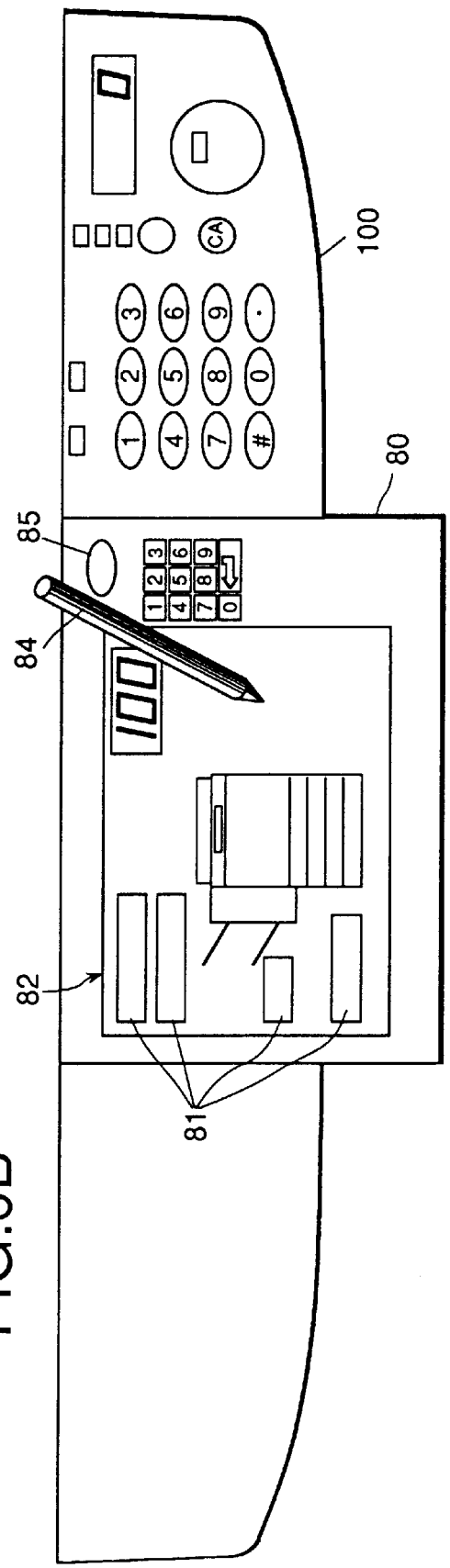

FIGS. 6A and 6B show an example of indication on the display screen of the portable terminal device 80 that is, as described above, a mobile computer with a color display 82. When the user turns on a power supply switch 85 on the portable terminal device 80 not mounted on the copying machine 10, a menu of application programs (for instance, Spread Sheet Program, Word Processor, Setting, Ending) installed therein appears on the color display 82 as seen in FIG. 6A. The user selects any one of the programs by pressing the indicator with a touch pen 84 and then can use the device 80 as a typical personal computer. When the user turns on power switch 85 on the portable terminal device 80 attached to the operation panel 100 of the copying machine 10, a screen image for inputting data (for instance, Copy Mode, Expansion Function, Equal Scale, Automatic Density) necessary for control of the copying operation of the copying machine 10 appears in the blocks on the color display 82 in the FIG. 6B. The user can preset and input processing data (copying conditions) such as optical density of an image, enlargement and so on by using pressing indicators with the touch pen 84 on the touch panel 81.

Figure 7A:
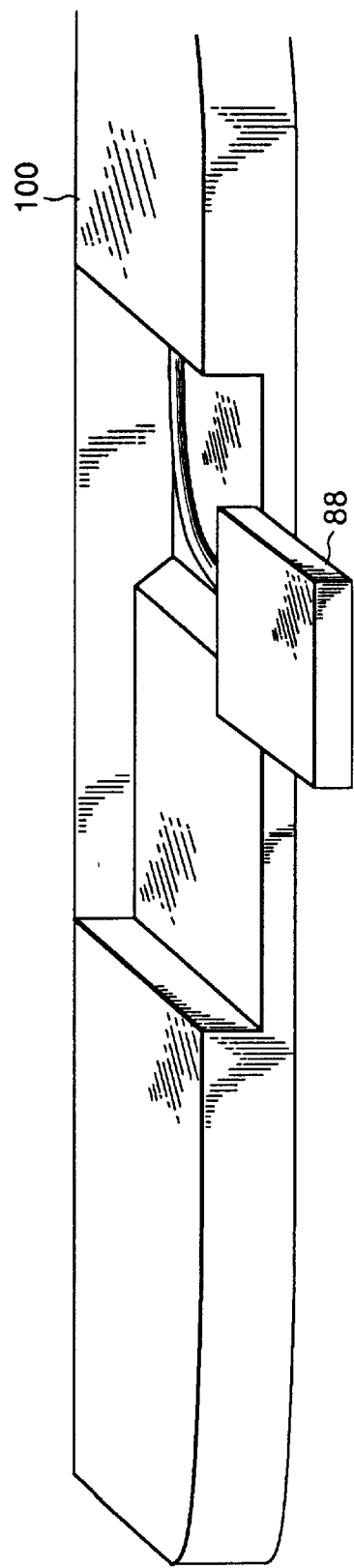
FIGS. 7A and 7B illustrate how to mount a terminal device on the copying machine operation panel.
Figure 7B:
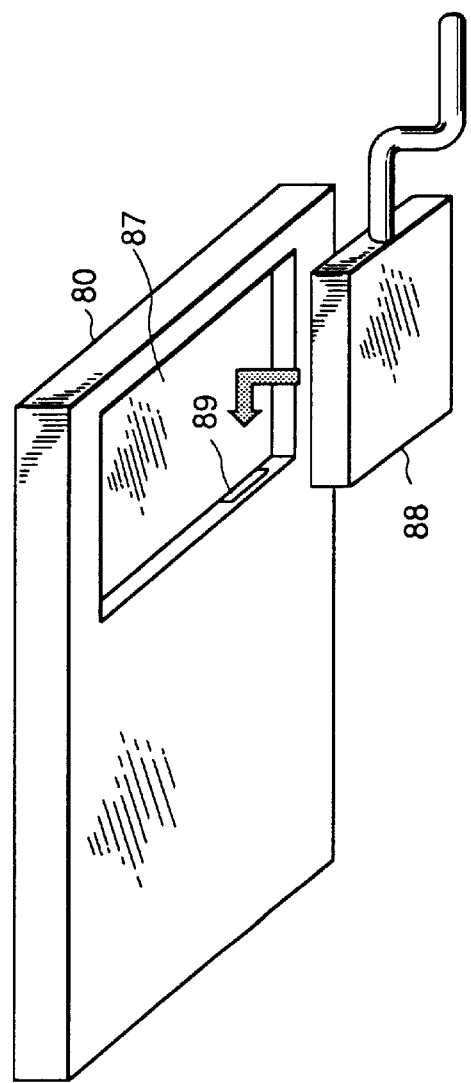

FIGS. 7A and 7B are views for explaining how to attach the portable terminal device onto the operation panel of the copying machine. The mounting seat formed on the center portion of the operation panel 100 of the copying machine 10 incorporates a power supply unit 88 as shown in FIG. 7A. This power supply unit 88 has the same form as that of a rechargeable battery unit 86a, 86b mounted in the portable terminal device 80. Therefore, the portable terminal device 80 can be fitted with the power supply unit 88 in a compartment (battery magazine) 87 as shown in FIG. 7B after removing therefrom the rechargeable batteries 86a and 86b. Thus, the portable terminal device 80 can be powered from the copying machine 10 through the power supply unit 88 connected with a power terminal 89.

It is also possible that the copying machine is provided with two power supply units 88 connectable at two power terminals 89 to two corresponding rechargeable batteries 86a, 86b in the battery magazine 87 of the portable terminal device 80. The copying machine 10 may be provided with a protection cover removably attached to a compartment for mounting the power supply unit 88 when the machine 10 works alone without the portable terminal device 80.

Figure 8:
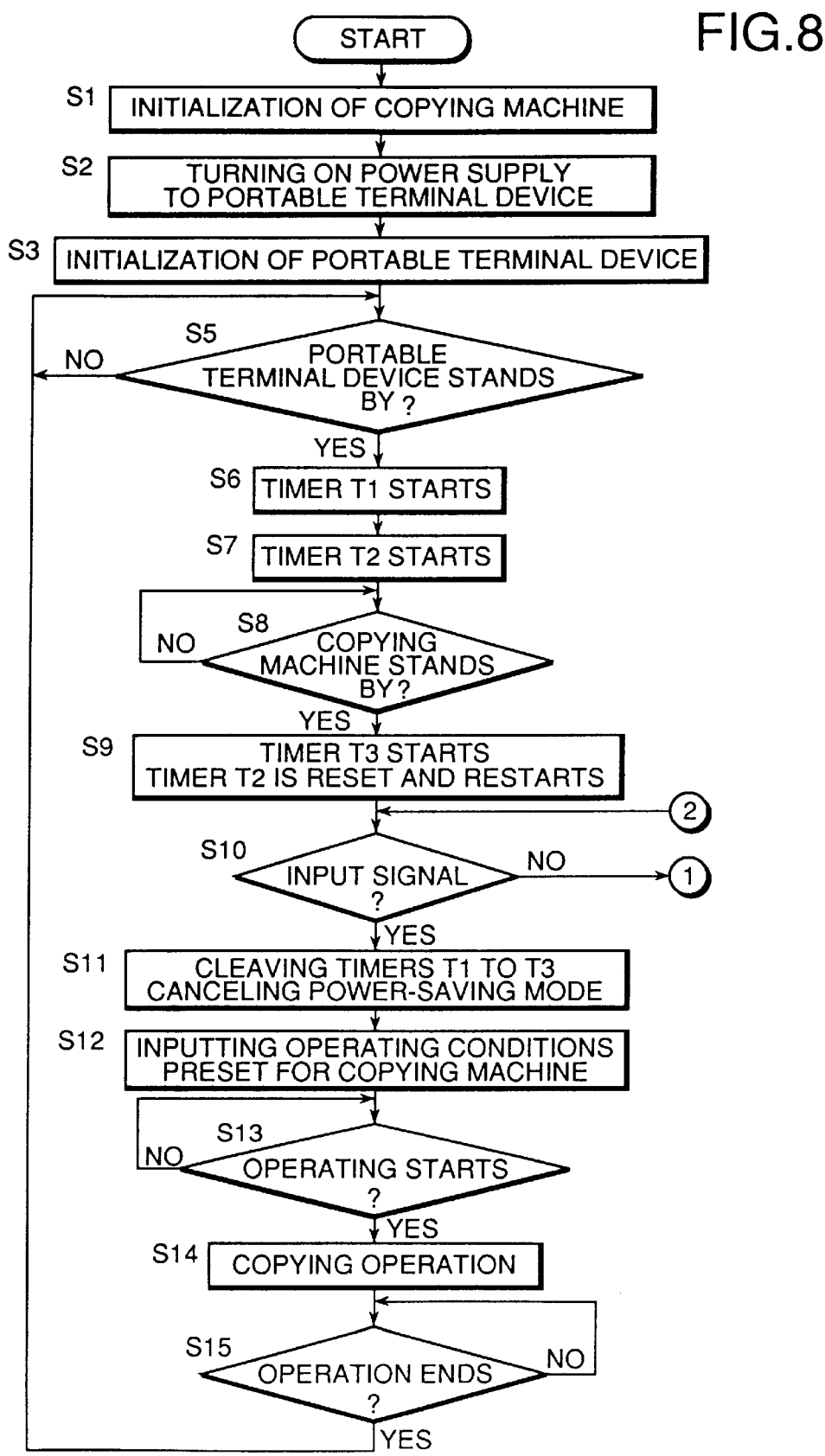
FIGS. 8 and 9 are flow charts depicting the first example of a processing procedure of a control section to control a copying machine and a terminal device in a data-processing system embodying the present invention.
Figure 9:
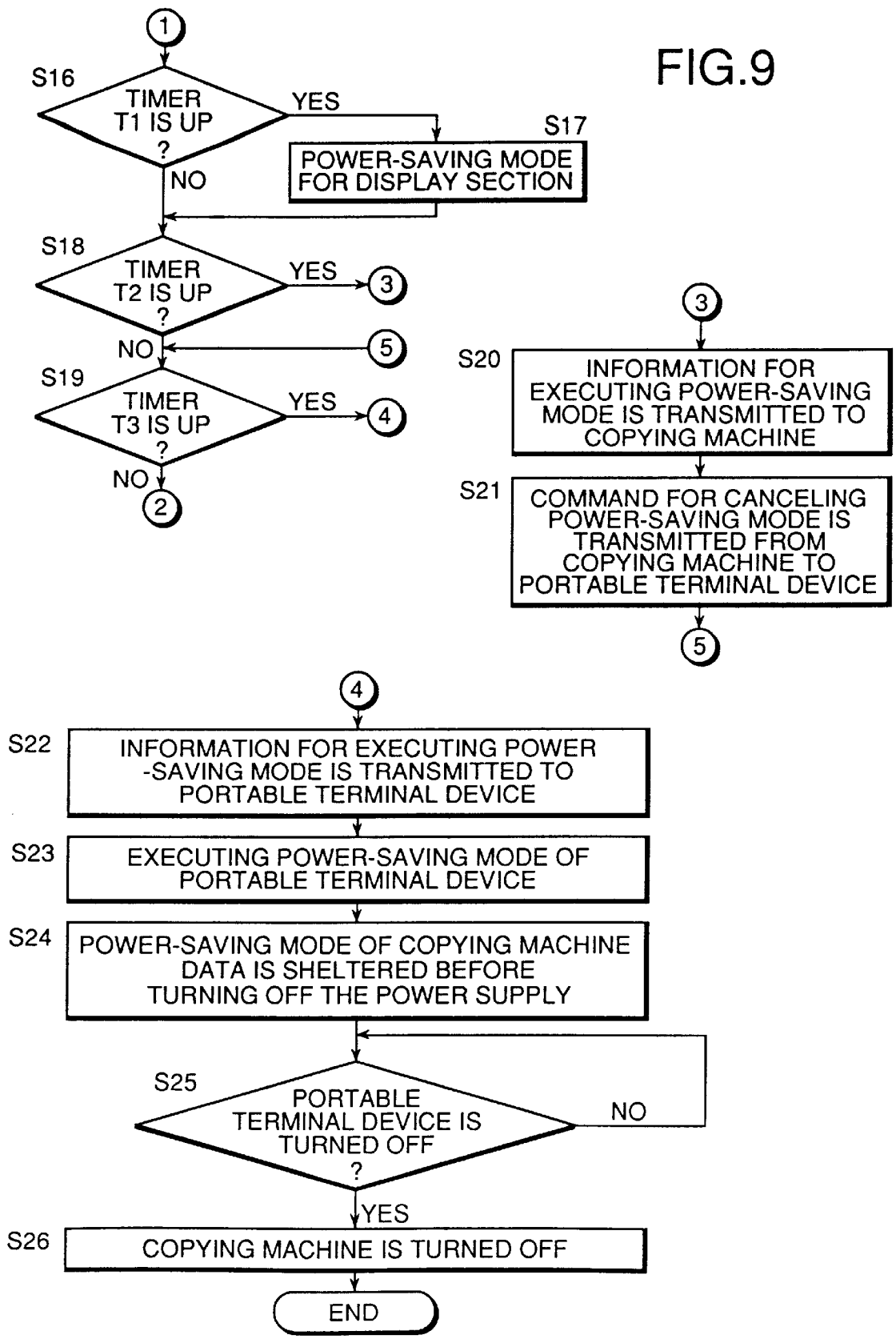

FIGS. 8 and 9 are flow charts depicting the first exemplified processing procedure of the control section of a data-processing system composed of the above-described copying machine and portable terminal device. When the copying machine 10 with the terminal device 80 mounted on the operation panel 100 thereof is turned on, the central processing unit 44 executes the initial setting of the copying machine 10 and turns on the power supply to the portable terminal device 80 (Steps s1 and s2). The CPU 54 of the portable terminal device 80 starts the initial settings (Step s3), brings the portable terminal device 80 into waiting state (Step s5) and, at the same time, drives a power-saving-mode starting timers T1 for the display and T2 for the power supply source (Steps s6 and s7).

The timer T1 is set to interrupt the power supply circuit of the display 82 of the portable terminal device 80 when a first preset time elapsed with no operation made on the device 80. The timer T2 is set to switch off the power supply to the portable terminal device 80 when a second preset time elapsed with no operation of the device 80. The display 82 of the portable terminal device 80 is turned off when the first preset time elapsed with no operation made on the device 80 and the terminal device 80 itself is switched off when the second preset time elapsed with no operation made thereon. However, the portable terminal device 80 mounted on the copying machine 10 may not be switched off even when the second preset time elapsed.

The second preset duration of time is longer than the first preset duration of time. This allows the CPU 54 to operate until the second timer T2 reaches the second preset time after turning off the display 82 by the effect of the timer T1. When the user uses any key switch 83 on the terminal device 80 in the above described state, the power-saving mode of the display is immediately canceled and the display 82 shows its screen image indicated thereon just before it was turned off.

The copying machine 10 is initialized and stands by for working (Step s8). The central processing unit 44 drives a power-saving mode starting timer T3 (Step s9) and causes the CPU 54 of the portable terminal device 80 to reset the power-saving-mode starting timer T2.

The power-saving-mode starting timer T3 is set to switch off the power supply of the copying machine 10 when a third preset time has passed with no signal input to the central processing unit 44. Consequently, the power supply of the copying machine is turned off when the third preset time elapsed with no signal input to the central processing unit 44.

The central processing unit 44 of the copying machine 10 waits for signals input from key-switches 91–98 disposed on the operation panel 100 of the copying machine 10 and/or signals input through the touch panel 81 or key-switches 83 of the portable terminal device until the power-saving-mode starting timer T1 for the display or the power-saving-mode starting timer T2 for the portable terminal device or T3 for the copying machine 10 (Steps s10, s16–s19) reaches the preset value. When the power-saving-mode starting timer T3 (for the display) reaches the preset time without causing the timers T2 (for the terminal) or T3 (for the copying machine) to operate, the power-saving mode begins by turning off the display 82 of the portable terminal device 80 (Step s17).

Upon receipt of a signal input through key-switches 91–98 disposed on the operation panel 100 or the touch panel 81 or the keys 83 of the portable terminal device 80, the central processing unit 44 resets the timers T1–T3 and cancels the display power-saving-mode if it has been executed (Step s11). The unit 44 then accepts copying conditions to be set and input by means of the operation panel 100 or the touch panel 81 (Step s12). When a start key 93 has been operated, the central processing unit 44 effects the copying machine 10 to perform copying operations according to the preset conditions (Step s13, s14). The copying operation ends and the central processing unit 44 returns to the waiting state (changing state from Step s15 to Step s5).

When the second preset time (preset on the timer 2) has elapsed with no operation made on the copying machine 10 and the portable terminal device 80 (Step s18), the CPU 54 of the terminal device 80 provides the central processing unit 44 with data for informing of executing the power-saving mode for the terminal device 80 (Step s18→Step s20). Upon receipt of the above data, the central processing unit transmits data for canceling the power-saving mode of the terminal device 80 to the CPU 54 (Step s21).

When the third preset time (preset on the timer 3) has passed with no operation made on the copying machine 10 and the portable terminal device 80 (Step s19), the central processing device 44 of the copying machine 10 provides the CPU 54 of the terminal device 80 with data for informing of executing the power-saving mode (Step s22). Upon receipt of the above data, the CPU 54 executes the power-saving mode of the portable terminal device 80 (Step s23). In the power-saving mode, the CPU 54 transfers records of data from a RAM (volatile memory) 58 to a hard disc (non-volatile memory) and then turns off the power supply of the portable terminal device 80. On the other hand, the central processing unit 44 transfers the states of its portions into a non-volatile memory (Step s24), recognizes the switched-off state of the portable terminal device 80 (Step s25) and then turns off the power supply of the copying machine 10 (Step s26).

The above-described procedure is applied to a single-unit system formed by the copying machine 10 provided with the portable terminal device 80 mounted thereon and enables the system to turn off its power in the power-saving mode by causing the central processing unit 44 and the CPU 54 to simultaneously execute the necessary operations on the machine 10 and the device 80 respectively after the predetermined duration of time with no operation made on both components of the system.

Figure 10:
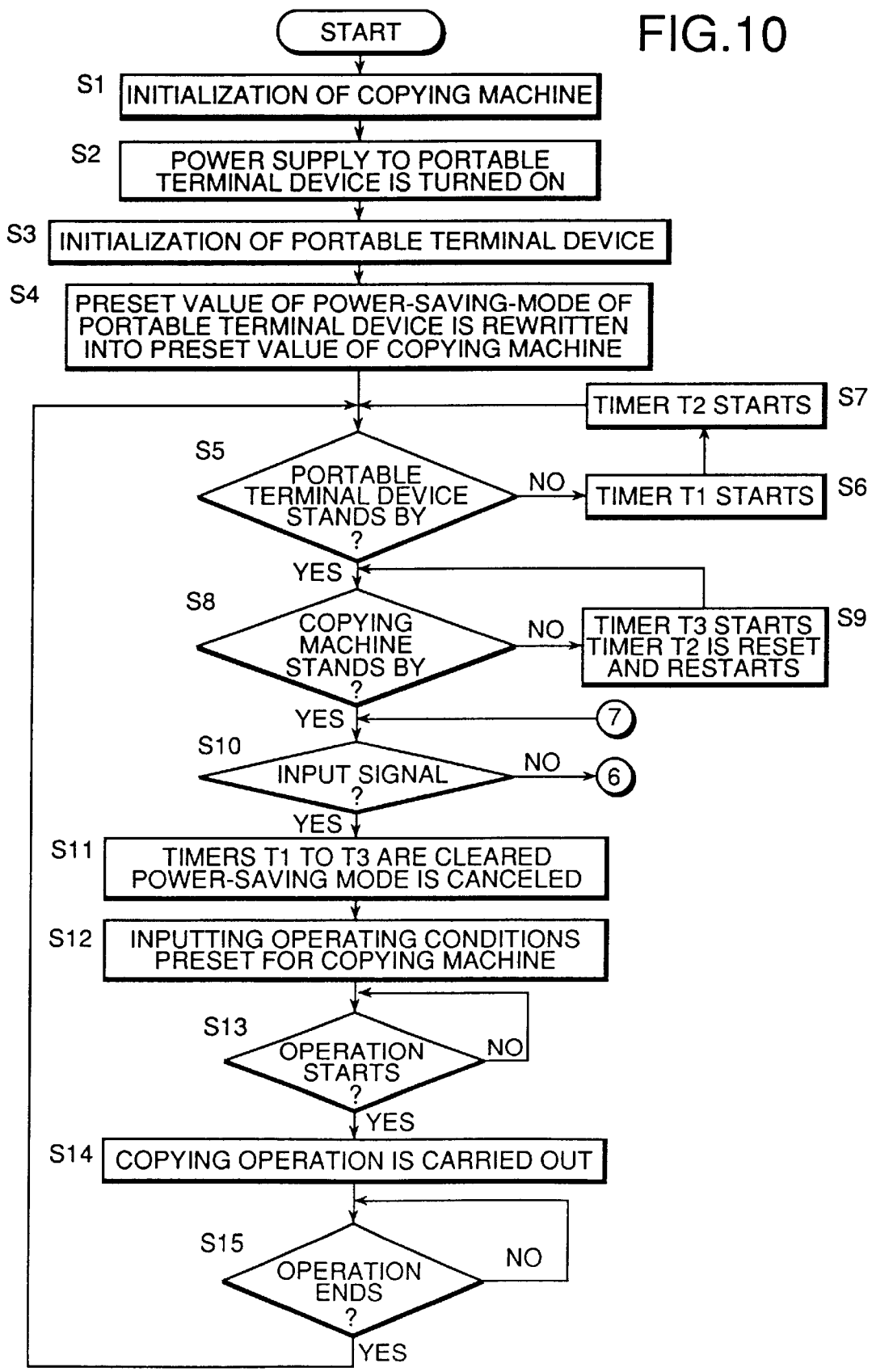
FIGS. 10 and 11 are flow charts depicting the second example of a processing procedure of a control section to control a copying machine and a terminal device in a data-processing system embodying the present invention.
Figure 11:
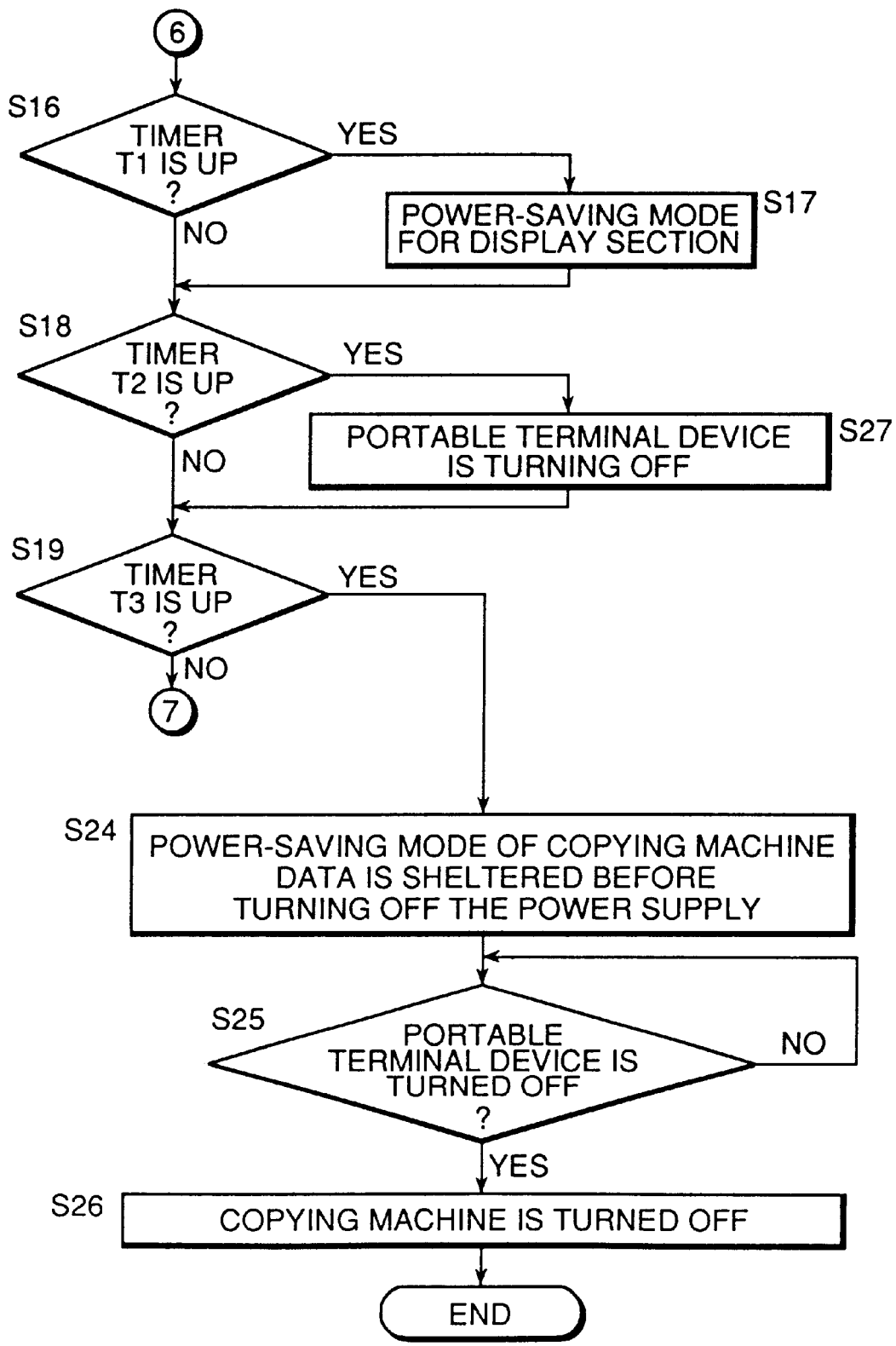

FIGS. 10 and 11 are flow charts depicting the second exemplified procedure of the control sections of a copying machine and a portable terminal device according to the present invention. The flow chart of FIGS. 10 and 11 are distinct from the flow chart of FIGS. 8 and 9 by inserting Step s4 between Steps s3 and s5, including Step s27 in place of Steps s20 and s21 and deleting Steps s22 and s23. Namely, the central processing unit 44 of the copying machine 10 at the initial setting stage provides the CPU 54 of the portable terminal device 80 with the third preset time of the power-saving-mode starting timer T3 as a preset time to be measured by the power-saving mode stating timer T2 for the portable terminal device 80. The CPU 54 presets the received duration of time on the timer T2.

On completion of the initial setting operation, the power-saving-mode starting timer T3 for the copying machine 10 is driven and, at the same time, the power-saving-mode starting timer T2 for the portable terminal device 80 is reset (Steps s8 and s9). This causes simultaneous actuation of the timer T2 on the terminal device 80 (Step s18) and the timer T3 on the copying machine 10 (Step s19). In the other words, the power-saving-mode of the portable terminal device 80 is conducted independently at substantially the same time as the power-saving-mode of the copying machine 10 is conducted (Step s27). This eliminates the need for performing Steps s20 to s23 for synchronizing both actions.

Figure 12:
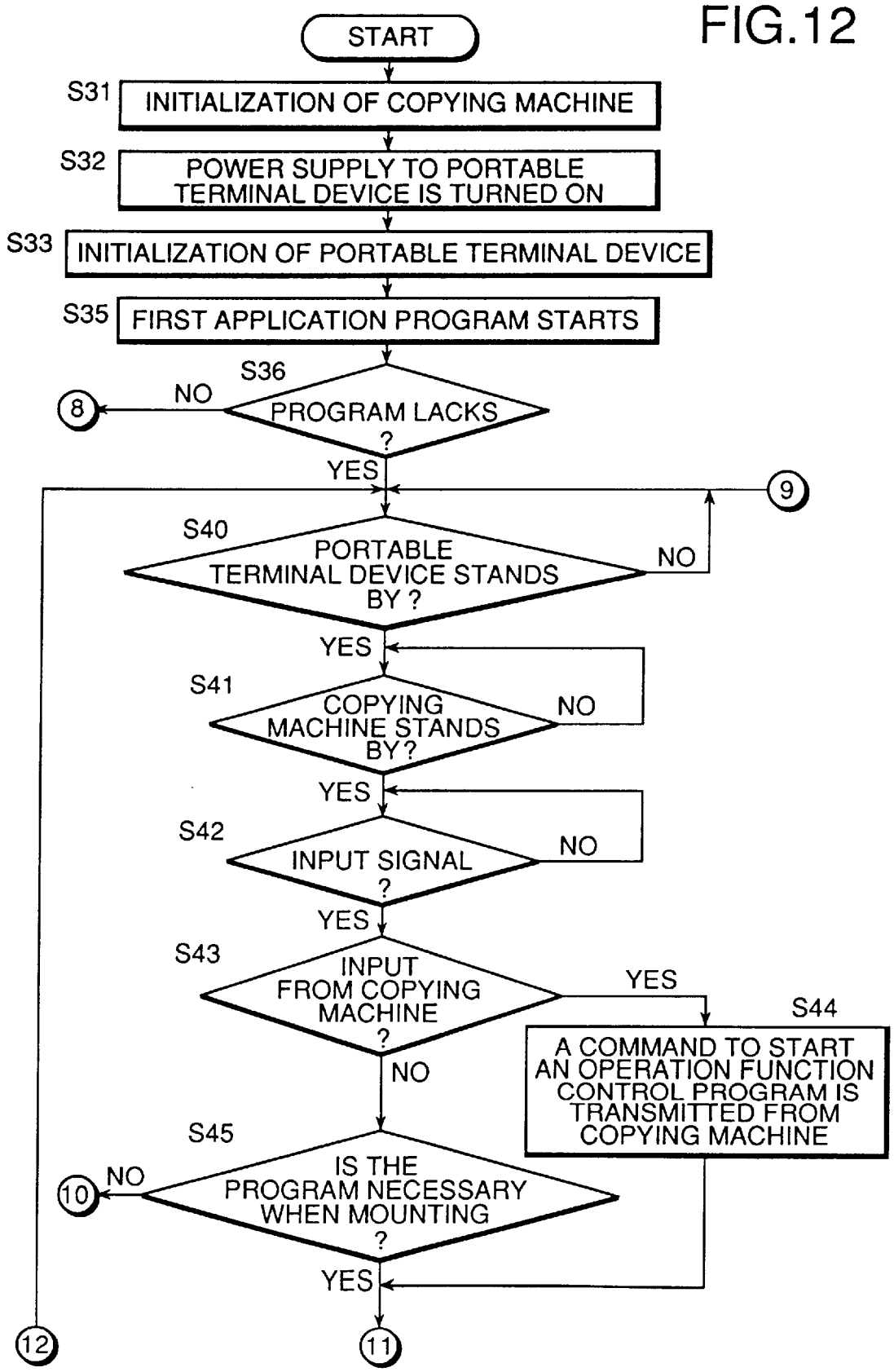
Figure 13:
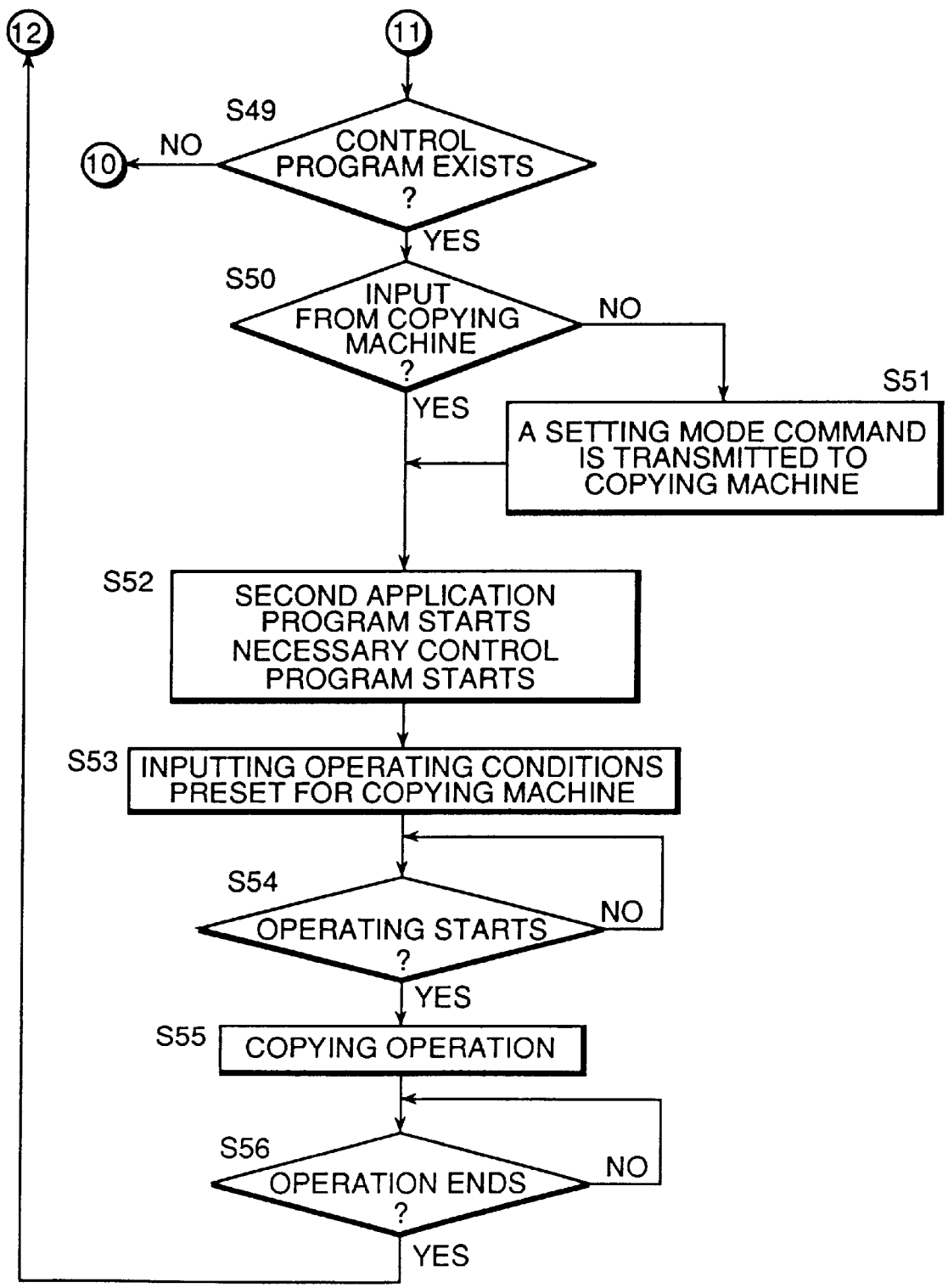

FIGS. 12, 13 and 14 are flow charts depicting the third exemplified procedure of the control sections of a copying machine and a portable terminal device, which compose a data processing system according to the present invention. When the user has turned on the power supply of the copying machine 10 with the portable terminal device mounted on the operation panel 100 thereof, the central processing unit 44 in the initial setting mode of the copying machine 10 turns on the power supply of the portable terminal device 80 (Steps s31, s32). The CPU 54 of the terminal device 80 conducts initial setting steps (Step s33). In this stage, the CPU 54 drives the first application program (Step s35).

This application program is a system control program for control of all programs stored in the portable terminal device 80. This program is used for recognizing and controlling the applicability of each of plural functional-control programs relating to copying operations to be performed by the copying machine 10.

Figure 15:
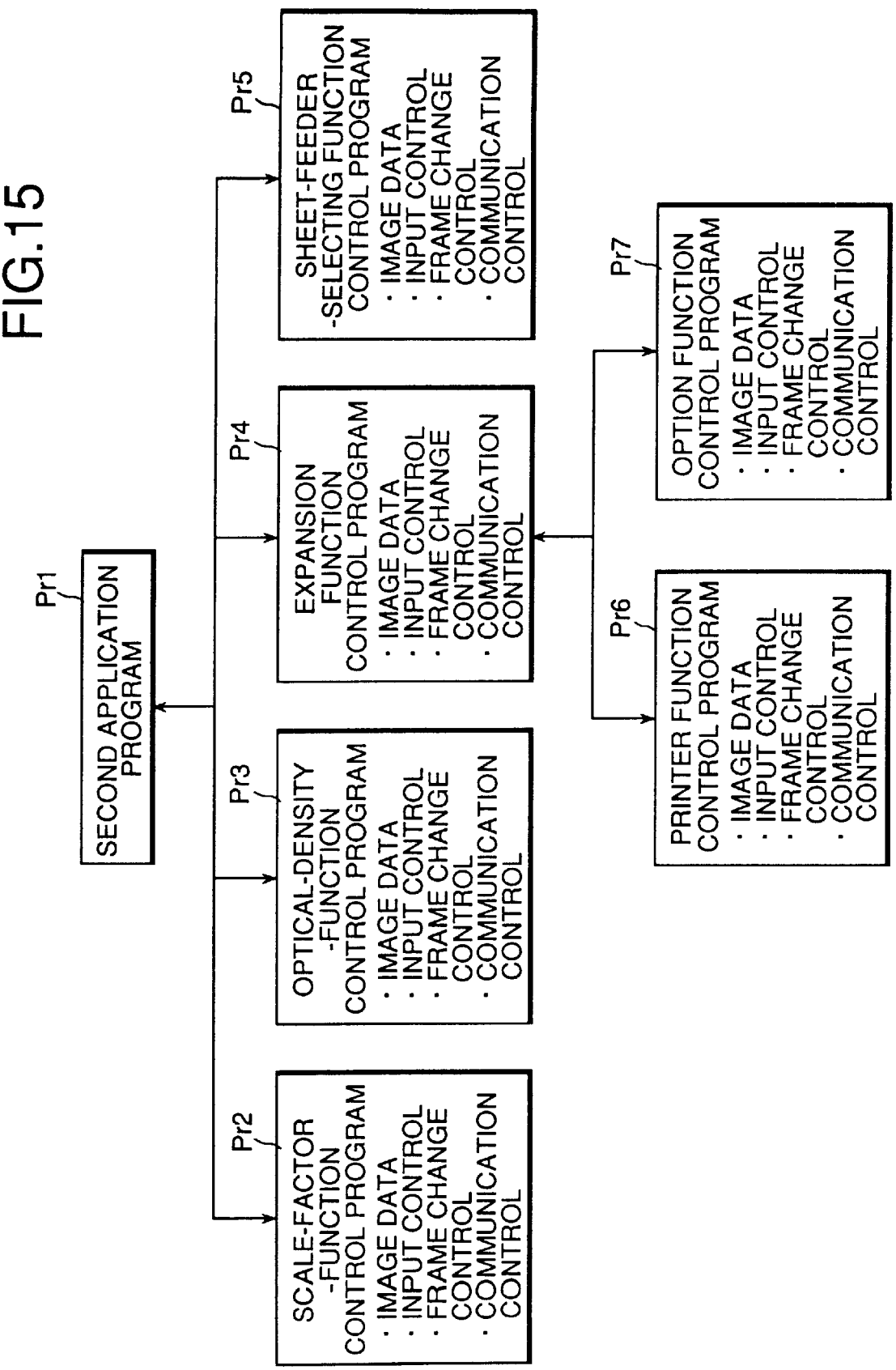
FIG. 15 is illustrative of an exemplified program for control of copying function to be executed by a copying machine of the data-processing system embodying the present invention.

FIG. 15 shows an example of the functional control programs Pr2 to Pr7 relating to the copying operations to be performed on the copying machine 10. The portable terminal device 80 preliminarily holds a part or all of the programs Pr2 to Pr7 together with other programs such as a spread sheet program that does not directly concern any copying function of the copying machine 10. The terminal device 80 can preliminarily register the applicability of respective programs stored therein so that it can smoothly perform the processing operation as attached to the copying machine 10 without driving unnecessary or scarcely needed programs. On the other hand, the copying machine 10 needs to preliminarily recognize its functions that may be used by the terminal device 80. This is achieved by the copying machine 10 by recognizing the registered applicable functional control programs in the terminal device by using the first application program.

At the same time, the copying machine 10 can also know that any program necessary for executing the operation thereon is registered as "inhibited to use" or is absent in the portable terminal device by using the first application program that can present registered states of all programs stored in the terminal device 80. Accordingly, the CPU 54 examines the registration of applicable programs for completeness to realize all necessary functions of the copying machine 10, using the first application program (Step s36).

It is also possible to store the first application program in the copying machine. In this case, the central processing unit 44 examines the registered states of the respective functional programs stored in the portable terminal device 80, communicating with the CPU 54.

It is also possible that the CPU 54 of the portable terminal device 80 recognizes the completeness of programs necessary for realizing the copying process of the copying machine 10 by using an initial setting program stored in a read-only memory ROM 55 (without using the first application program).

The CPU 54 of the portable terminal device 80 gives an indication on the display 82 when any necessary program is absent (Step s37) and waits for selection of the user whether he or she wants the execution of copying processing by using the system composed of the copying machine and the portable terminal device 80 (Step s38). If the user did not require the execution of the processing, the CPU turns off the power supply of the portable terminal device 80 and transmits to the central processing unit 44 a signal requiring switching-off of the power supply of the copying machine 10 (Step s39).

When all programs necessary for realizing the copying operations of the system composed of the copying machine 10 and the portable terminal device 80 exist in the device 80 or the user desired the system to execute the copying processing, the CPU 54 of the portable terminal device 80 and the central processing unit 44 of the copying machine 10 completes the initial setting on the respective sides and then stands by for a signal input by the user through the touch panel 81 or the key switches 83 of the terminal device 80 or key switches 91~98 arranged on the operation panel 100 of the copying machine 10 (Steps s40 to s42).

When a signal was inputted through the operation panel 100 of the copying machine, the central processing unit 44 transmits data to the CPU 54 of the portable terminal device 80 to start a program for causing the display 82 to indicate the content of the operation made on the operation panel 100 and a program for accepting inputting data preset by the user through the touch panel 81 (Step s43→Step s44).

A signal is inputted through the touch panel 81 or the key switches 83 of the portable terminal device 80 and the CPU 54 examines whether the input signal relates to the copying processing on the copying machine 10 (Step s43→Step s45). If the input concerns a different function such as a spread sheet program or a word processing program, which can be performed by the portable terminal device 80 in the separate condition, the CPU operates the display 82 to indicate a message "impossible to use" (Steps s46 and s47).

When data for starting a designated program has been inputted from the central processing unit 44 at Step s44 or a copying-process-related signal has been inputted through the touch control panel 81 or the keys 83, the CPU 54 examines whether the necessary programs exist in the portable terminal device 80 (Step s49). If the program is absent therein, the CPU 54 causes the display 82 to present a message "Processing is impossible" on its screen (Step s49→Steps s46, s47).

When the designated program exists in the portable terminal device 80 and a signal input from the touch panel 81 or the key switches 83 relates to the copying processing, the CPU 54 transmits a command indicative of a setting mode for the input operation content to the central processing unit 44 (Step s50→Step s51), drives the second application program Pr1 and designated one of the function-control programs Pr2 to Pr7 (Step s52) and then accepts input data of copying conditions (Step s53). When the copying condition data has been inputted through the touch panel 81 or the key switches 83, the CPU 54 transmits the copying condition data to the central processing unit 44.

The second application program Pr1 is used for selecting any one of the function-control programs Pr2 to Pr7.

When the user manipulates the start key 93 on the operation panel (Step s54), the central processing unit 44 of the copying machine 10 executes the copying processing according to the copying conditions transmitted from the portable terminal device 80 (Step s54). On completion of the processing, the central processing unit 44 returns into the waiting state (Step s56→Step s40).

The portable terminal device 80 mounted on the copying machine 10 can thus receive the input data concerning copying conditions for the copying machine 10. In this instance, the CPU 54 of the portable terminal device 80 can correctly conduct processing for accepting input data of preset copying conditions by using the system control program for control of all the programs stored in the portable terminal device 80. In absence of programs relating to a part of copying functions of the copying machine 10, the portable terminal device 80 conducts the copying operation by using functions covered by the programs stored therein, thus minimizing decrease of the working efficiency of the system. Furthermore, it is also possible to prohibit use of particular functions of the portable terminal device 80, which does not directly relate to the functions of the copying machine 10. This assures smooth execution of merely copying operations without driving any unrelated program.

Figure 16:
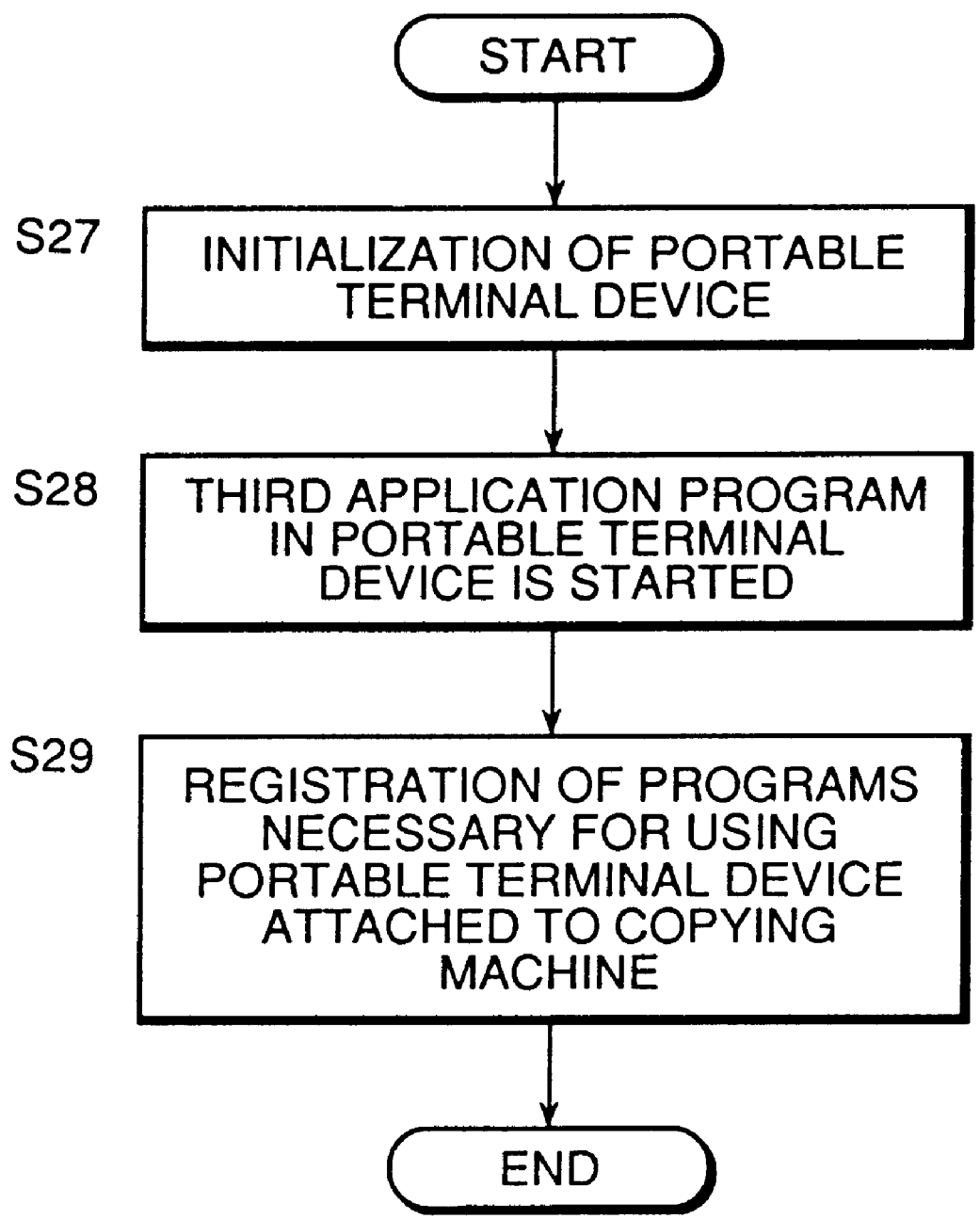
FIG. 16 is a flow chart depicting a variant of the third exemplified processing procedure of the control section.

If the portable terminal device 80 has an insufficient program necessary for realizing the copying operations, it is removed from the copying machine 10, turned on separately and initialized (Step s27), then drives a third application program (Step s28) to register the applicability of function-control programs to be used when the portable terminal device 80 is attached to the copying machine 10 as shown in FIG. 16. Namely, any necessary program can be thus additionally registered by using the third application program (Step s29).

The portable terminal device 80 can be externally loaded with any necessary but lacking program or a new program through a floppy disc or a hard disc.

Figure 17:
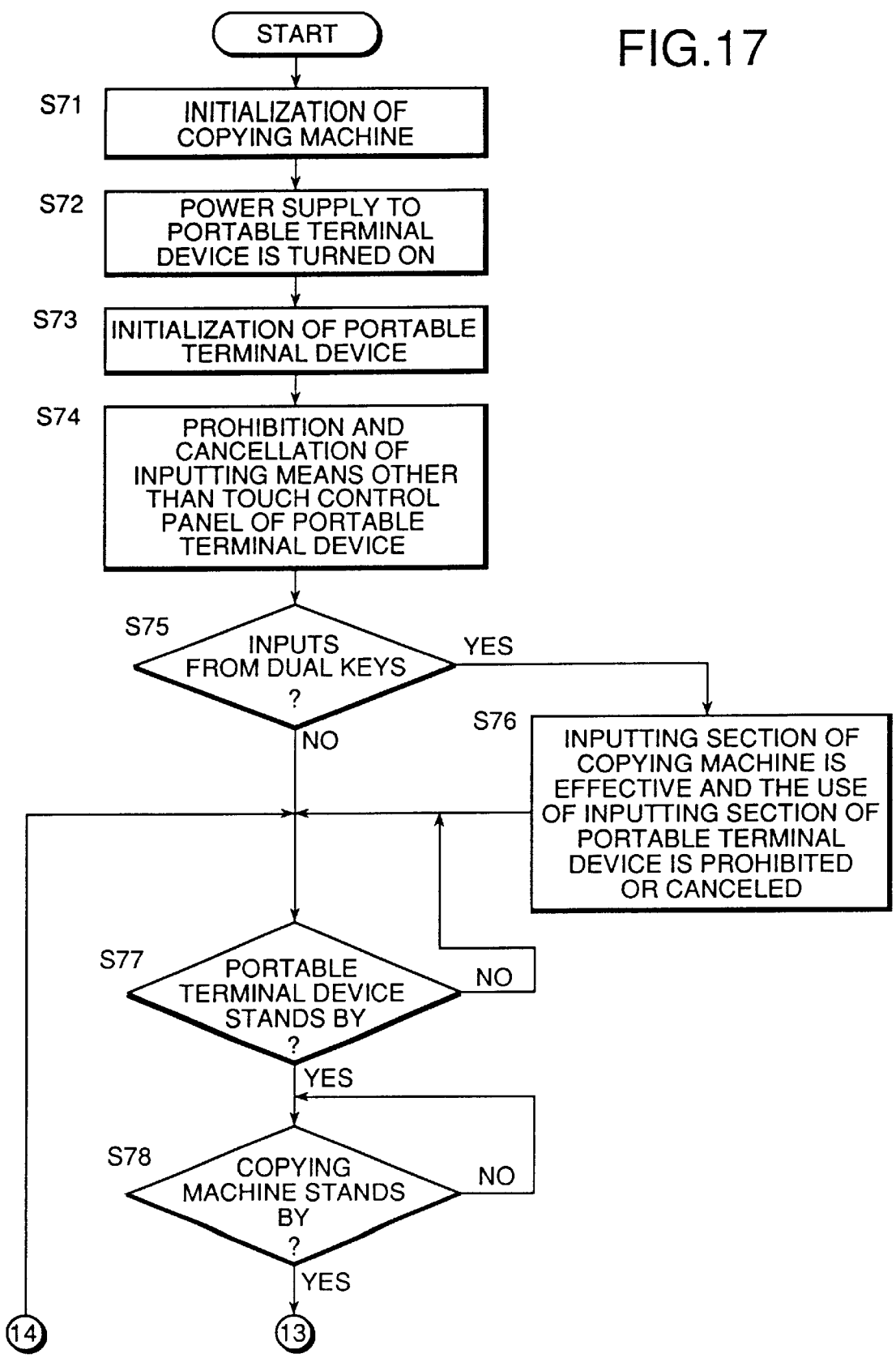
FIGS. 17 and 18 are flow charts depicting the fourth example of a processing procedure of a control section to control a copying machine and a terminal device in a data-processing system embodying the present invention.
Figure 18:
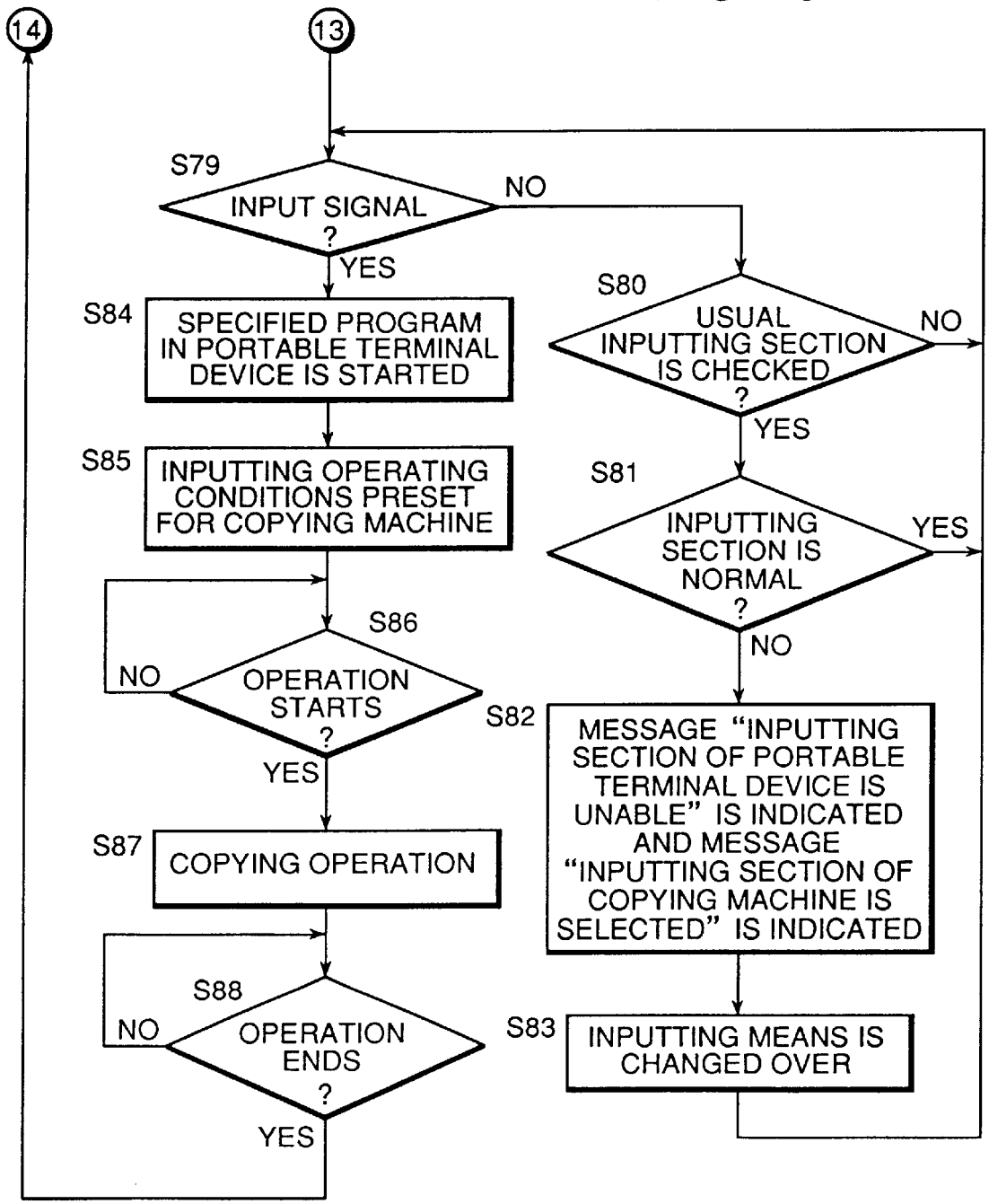

FIGS. 17 and 18 are flow charts depicting the fourth exemplified procedure of the control sections of a copying machine and a portable terminal device, which compose a data processing system according to the present invention. When the user has turned on the power supply of the copying machine 10 with the portable terminal device mounted on the operation panel 100 thereof, the central processing unit 44 in the initialization mode of the copying machine 10 turns on the power supply of the portable terminal device 80 (Steps s71, s72). The CPU 54 of the portable terminal device 80 conducts an initial setting procedure (Step s73). In this stage, the CPU 54 nullifies the operation of the keys such as a power-supply key 85 excepting the touch panel 81 of the terminal device 80 (Step s74). There may be the same-function inputting members by ones on the operation panel 100 of the copying machine and the touch control panel 81 of the portable terminal device 80. Therefore, ones of the same members are made effective and the others are made ineffective (Steps s75 and s76).

After initialization, the CPU 54 of the portable terminal device 80 and the central processing unit 44 of the copying machine 10 are set in the state waiting for inputting a signal through the touch panel 81 or key switches 83 of the portable terminal device 80 or the key switches 91~98 on the operation panel 100 of the copying machine 10 (Steps s77 to s79). In that state, the CPU 53 and the central processing unit 44 examine the correct functioning of the respective inputting members (Step s80). If any of the inputting members is abnormal, the CPU 54 indicates a sissified message on the display 82. When the found defective inputting member is one of the same inputting members on the copying machine 10 and the terminal device 80, amessage "the alternative member is made effective" is indicated on the display 82 and the alternative member is set to be effective instead of the defect one (Steps s81 to s83).

Upon receipt of an input signal, the CPU 54 drives a specified program (Step s84), accepts an input of copying conditions preset for the copying machine 10 (Step s85) and transmits the input preset conditions to the central processing unit 44 of the copying machine 10. On the other hand, when the start key 93 was pressed on the operation panel 100 (Step s86), the central processing unit 44 of the copying machine 10 starts execution of the copying process according to the preset copying conditions received from the portable terminal device 80 (Step s87). On the completion of the copying process, the CPU returns to the waiting state.

In the data processing system composed of the copying machine 10 with the portable terminal device 80 mounted thereon, the inputting members having forcible functions such as the power supply switch 85 or the like can be all nullified on the portable terminal device 80 so that the initial setting of copying conditions or the copying process of the copying machine 10 may not be forcibly interrupted by unintended operation of the power-supply switch 85 or the other inputting members on the portable terminal device 80. The data processing system having the same inputting members on the copying machine 10 and the portable terminal device 80 respectively can set ones of the same members to be effective and the others to be ineffective so that the user may easily input necessary data into the data processing system that may effectively process the data input by the user. Furthermore, the data processing system can select higher durable ones of respective dual members that relate to the same function but are different in durability. This ensures the higher reliability of the system. In the event of abnormal functioning of any inputting member, this data processing system can use an alternative (reserved) one in replace of the abnormal member by merely changing the ineffective state of the reserved member into the effective state. This ensures the high working efficiency of the system.

Figure 19:
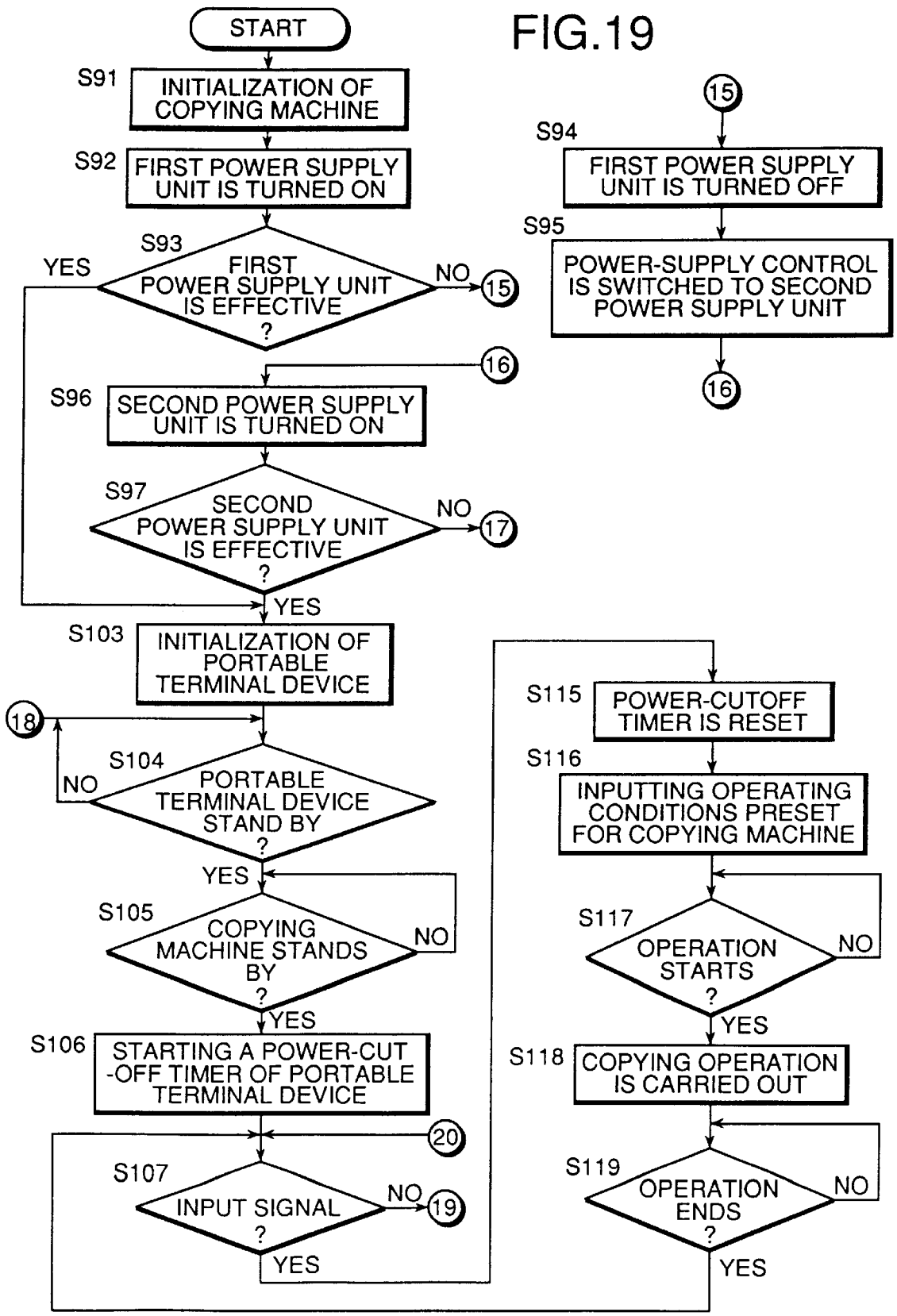
FIGS. 19 and 20 are flow charts depicting the fifth example of a processing procedure of a control section to control a copying machine and a terminal device in a data-processing system embodying the present invention.
Figure 20:
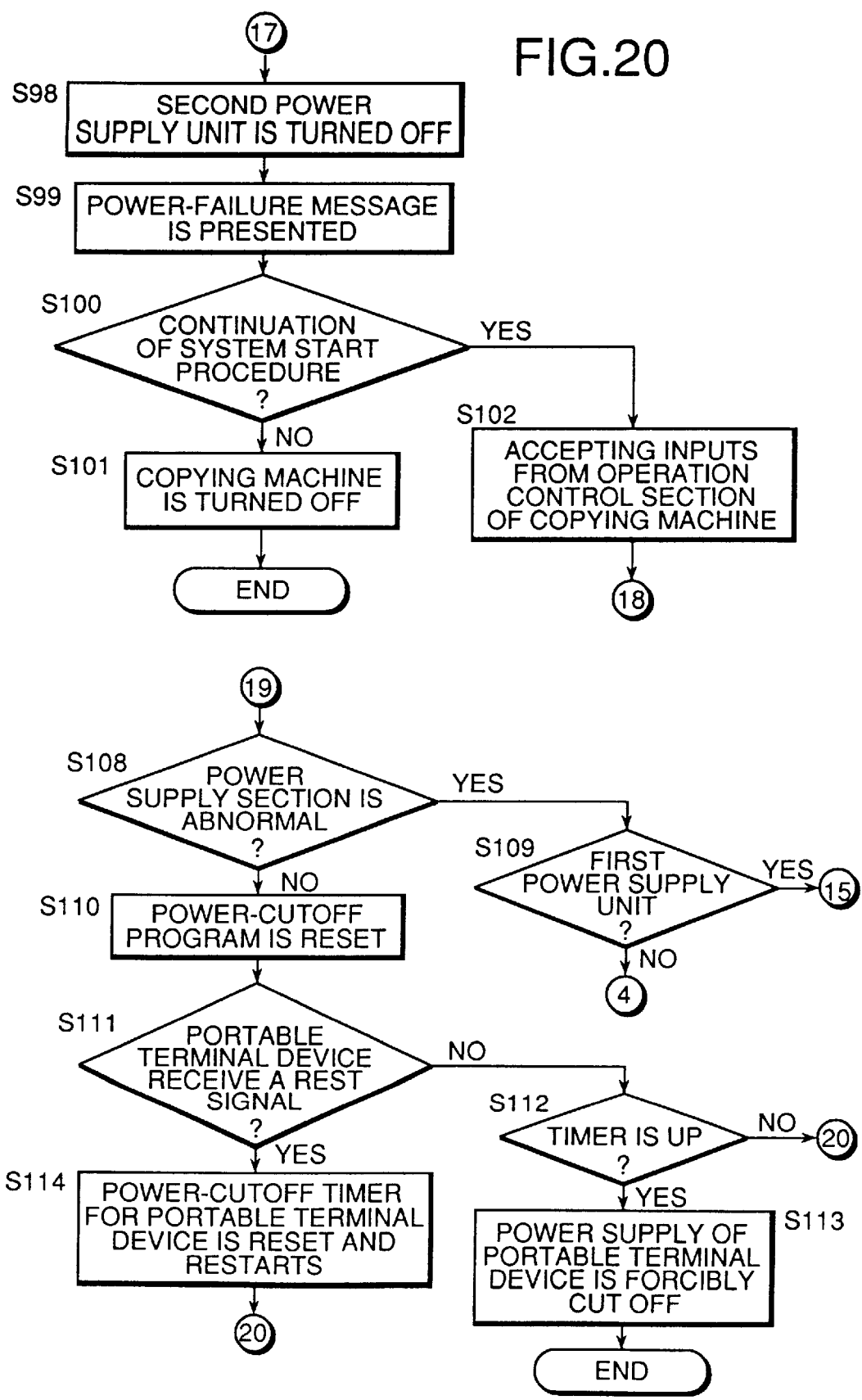

FIGS. 19 and 20 are flow charts depicting the fifth exemplified procedure of the control sections of a copying machine and a portable terminal device, which compose a data processing system according to the present invention. In this example, the copying machine 10 is provided with two (first and second) power-supply units 88 that are connected to a specified place 87 for mounting the portable terminal device 80. When the user has turned on the power supply of the copying machine 10 with the portable terminal device mounted on the operation panel 100 thereof, the central processing unit 44 in the initialization mode of the copying machine 10 supplies electric current from the first power-supply unit to the portable terminal device 80 (Steps s91, s92).

The central processing unit 44 checks whether the first power-supply unit 88 is normally working (Step s93). If not, the central processing unit 44 shuts off the power supply line from the first power-supply unit 88 (Step s94) and supplies the portable terminal device 80 with electric power from the second power-supply unit 88 (Steps s95 and s96). The central processing unit 44 checks whether the second power-supply unit is normally working (Step s97). If not, the central processing unit 44 shuts off the power supply line from the second power-supply unit 88 (Step s98), indicates a power-failure message on a display of the copying machine (Step s99) and changes the current state of the system into the state allowing the user to input data by using only the operation panel 100 of the copying machine on the user's request for continuation of energizing the system (Step s100→Step s102). Upon receipt of the user's instruction for interrupting the system start procedure, the central processing unit 44 turns off the power supply of the copying machine 10 (Step s100→Step s101).

The portable terminal device 80 is initialized (Step s103) if it is normally energized from either of the first and second power-supply units 88. After initialization of the terminal device 80 and the copying machine 10 (Steps s104, s105), the system starts a timer for forcibly shutting off the power supply of the portable terminal device 80 at a predetermined time (Step s106) and then stands by for an input signal (Step s107). This timer is disposed in the portable terminal device 80.

In the waiting state of the system, the central processing unit 44 checks whether the first or second power-supply unit 88 is normally working (Step s108). If the first power-supply unit is abnormal, the central processing unit 44 shuts off the power supply line from the first power-supply unit 88 and supplies the portable terminal device 80 with electric power from the second power-supply unit 88 (Step s109→Steps s94, s95). If the second power-supply unit is abnormal, the central processing unit 44 shuts off the power supply line from the second power-supply unit 88 and conducts the procedure according to the user's instruction (Step s109→Steps s98 to s102).

In place of the central processing unit, the CPU 54 of the portable terminal device 80 can check the normal working state of the power supply unit in the waiting state of the system. On detection of the abnormal power supply from the first power-supply unit 88, the CPU 54 sends a power-supply changing request to the central processing unit. On detection of the abnormal power-supply from the second power-supply unit 88, the CPU 54 sends a power-failure message to the central processing unit 44.

The central processing unit 44 of the copying machine 10 gives the portable terminal device 80 instruction for resetting the power-cutoff timer thereof (Step s110) when the portable terminal device 80 is normally energized from the first or second power supply unit 88. Upon receipt of the instruction, the CPU 54 of the portable terminal device 80 clears the time-count indication of the timer (Step s111→Step s114). If no instruction is given, the power-cutoff timer after the preset period actuates and forcibly turns off the power supply of the terminal device 80 (Steps s112 and s113). The forcible cutting-off of the power supply of the portable terminal device 80 may prevent the incorrect operation of the copying machine 10 when the copying conditions cannot correctly be transferred to the copying machine 10 through the portable terminal device 80 due to the incorrect communication between them.

When a signal has been inputted to the data-processing system in the waiting state, the CPU 54 resets the power-cutoff timer (Step s115) and the system accepts inputting of preset data on the copying conditions through a touch panel 81 of the portable terminal device 80 or the operation panel 100 of the copying machine 10 (Step s116). When the start key 93 was pressed, the copying process is carried out according to the preset copying conditions (Steps s117 and s118). On completion of the copying process, the data-processing system returns to the waiting state (Step s119→Step s117).

The above procedure realizes effective entering of the preset data on the copying conditions into the copying machine 10 through the portable terminal device 80 by effectively using either of the power-supply units 88.

Figure 21:
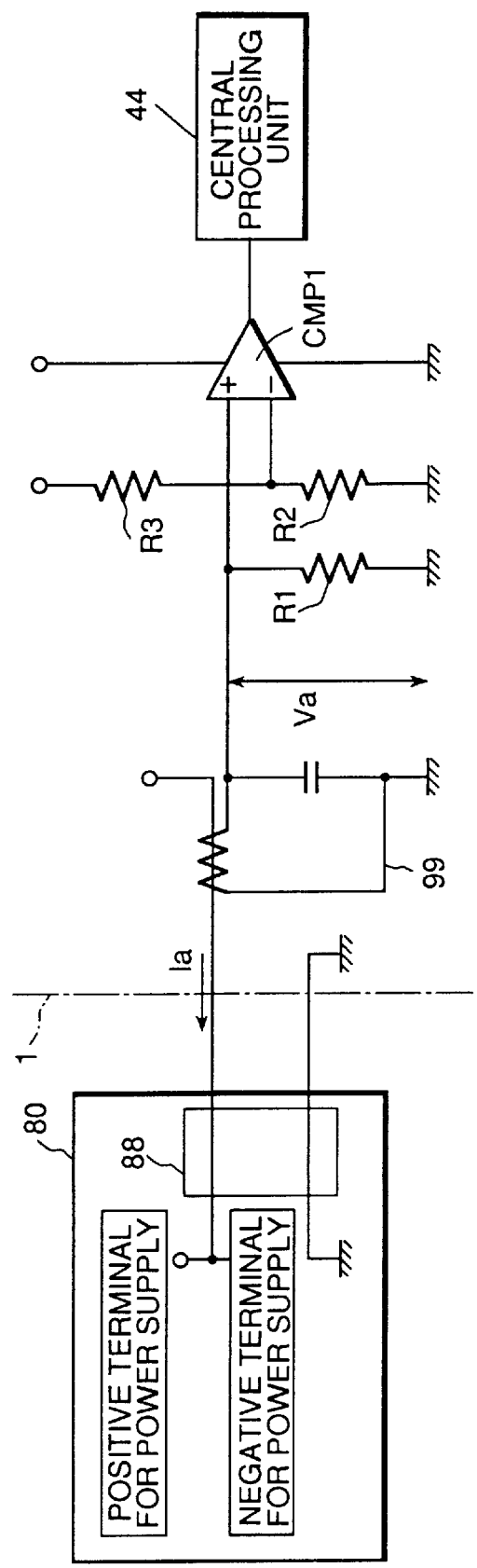
FIG. 21 shows an exemplified circuit for judging a state of a power-supply source which the copying machine has.

FIG. 21 shows an example of a power-supply-state discriminating circuit used for examining the state of power supply at Step s93. In the data-processing system comprising the copying machine 10 with the portable terminal device 80 mounted thereon, the discriminating circuit detects a value of electric current Ia flowing from the copying machine 10 to the terminal device 80 by using a current transformer 99 and converts the detected current value to a voltage value Va by using resistance RI. This voltage value Va is compared with a threshold value given by resistance R2 and R3 by a comparator CMP1 whose output is transmitted to the central processing unit 44.

The discriminating circuit has no current Ia flowing and the voltage Va being equal to zero and causes the comparator to output a low level signal, while the power-supply unit 88 in not connected to the portable terminal device 80. When the power-supply unit 88 is correctly connected with the portable terminal device 80, the specified current Ia flows and the voltage Va exceeding the threshold value appears, thereby the comparator CMP1 outputs a high level signal. Therefore, the central processing unit judges the correct connection of the power-supply unit 88 with the portable terminal device 80 according to the output signal level of the comparator CMP1.

Figure 22:
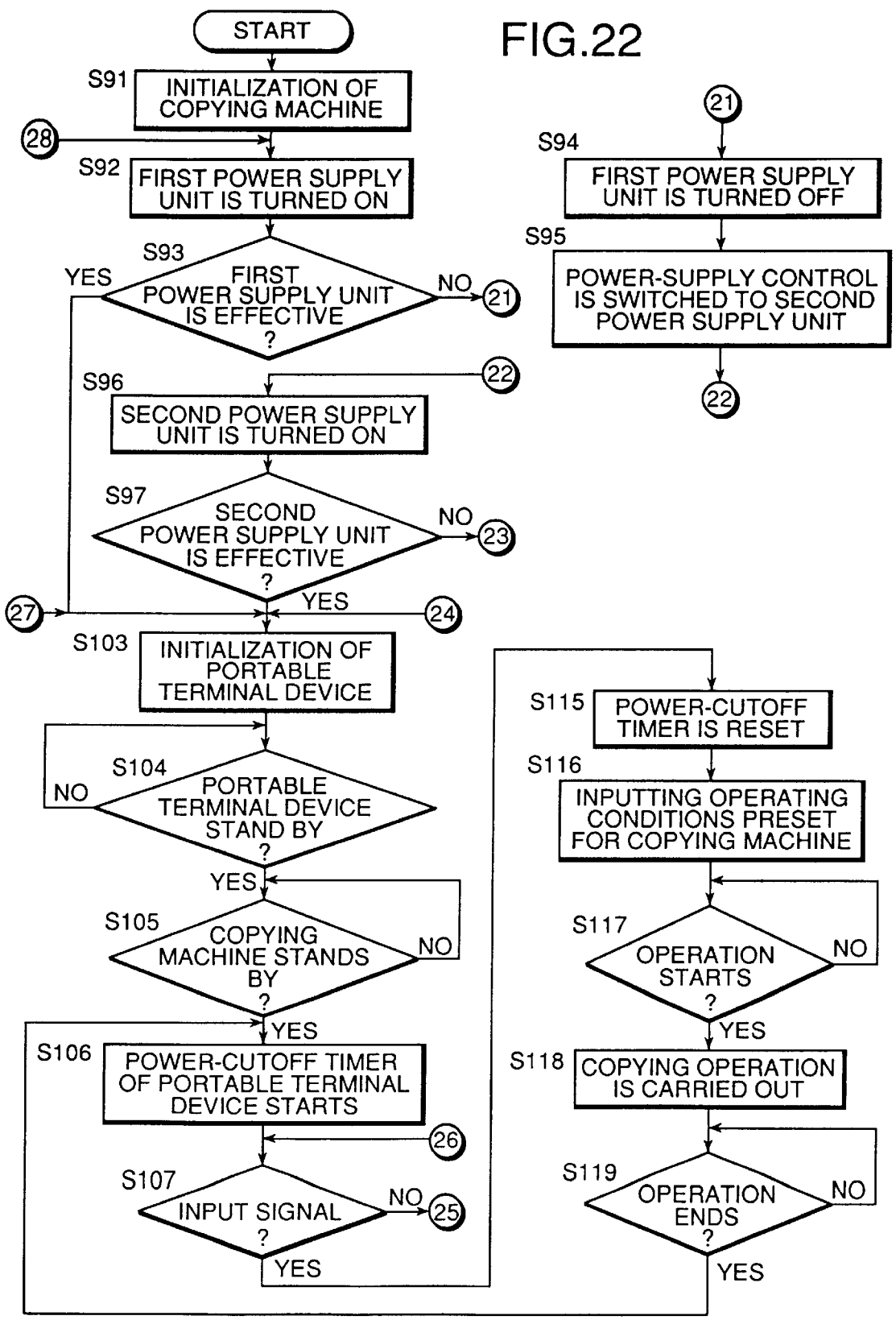
FIGS. 22 and 23 are flow charts depicting the sixth example of a processing procedure of a control section to control a copying machine and a terminal device in a data-processing system embodying the present invention.
Figure 23:
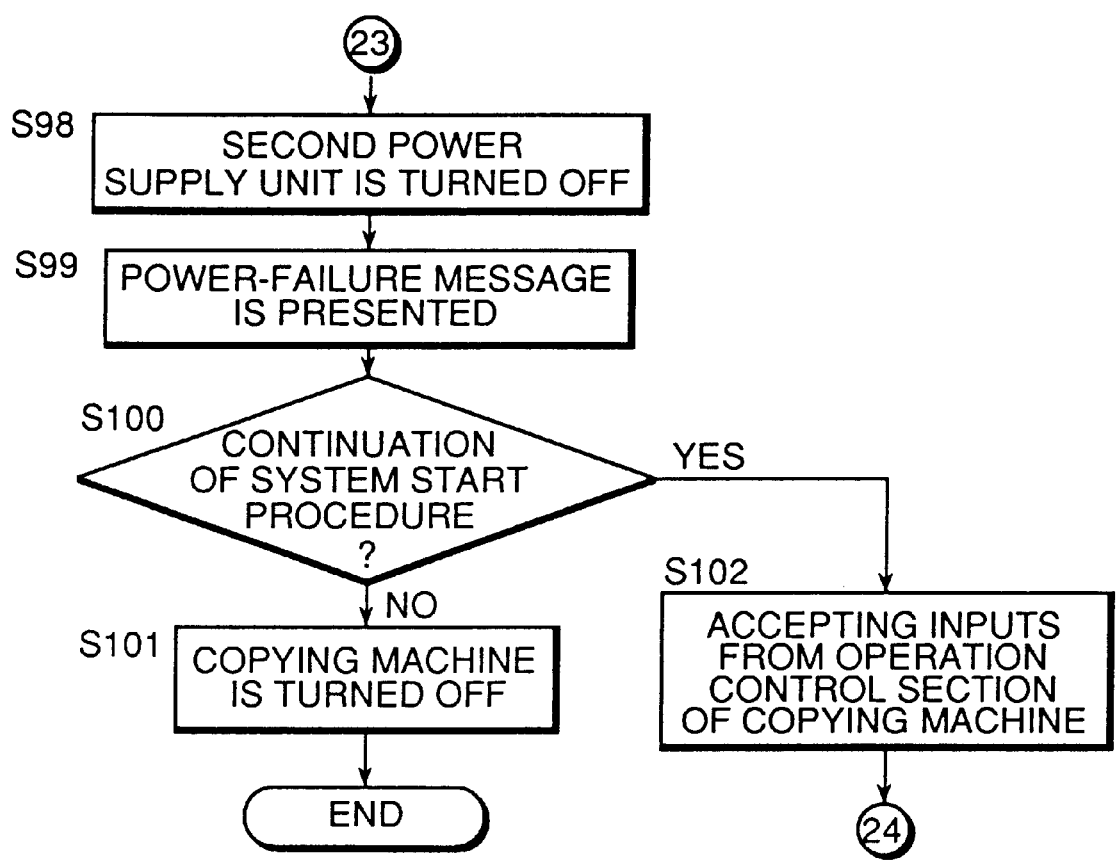
Figure 24:
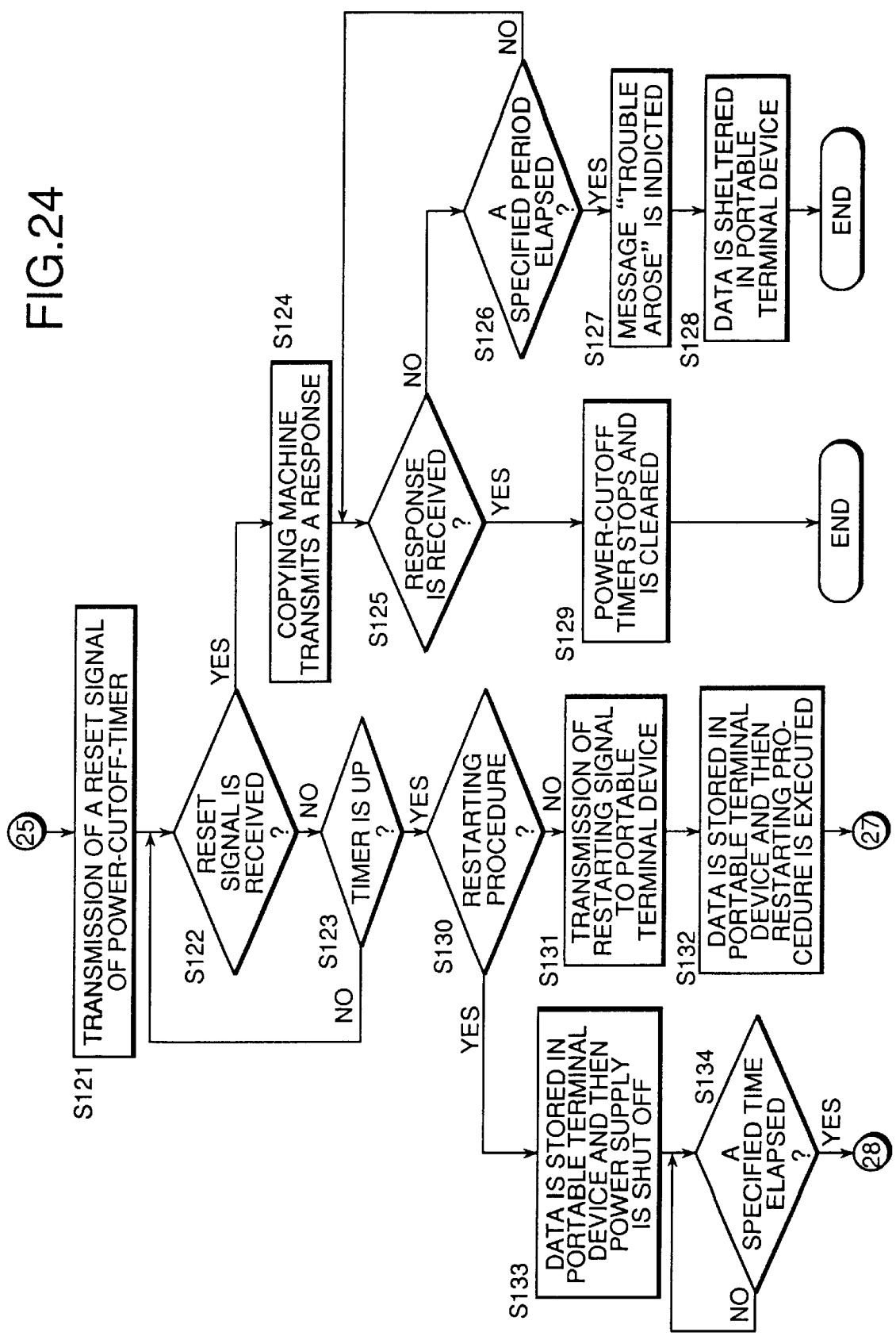
FIG. 24 is a continuation of the flow chart of FIGS. 22 and 23.
Figure 26:
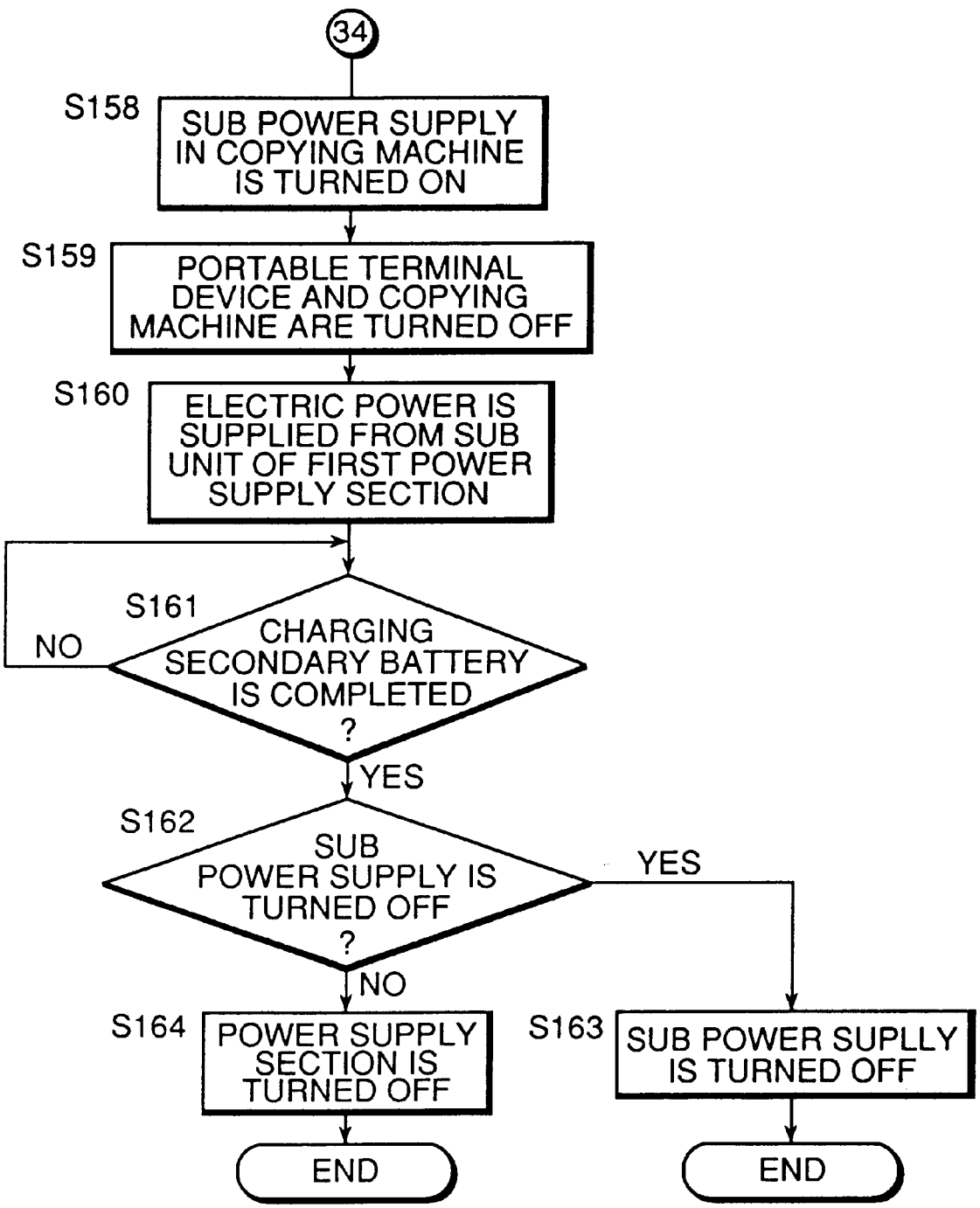
Figure 27:
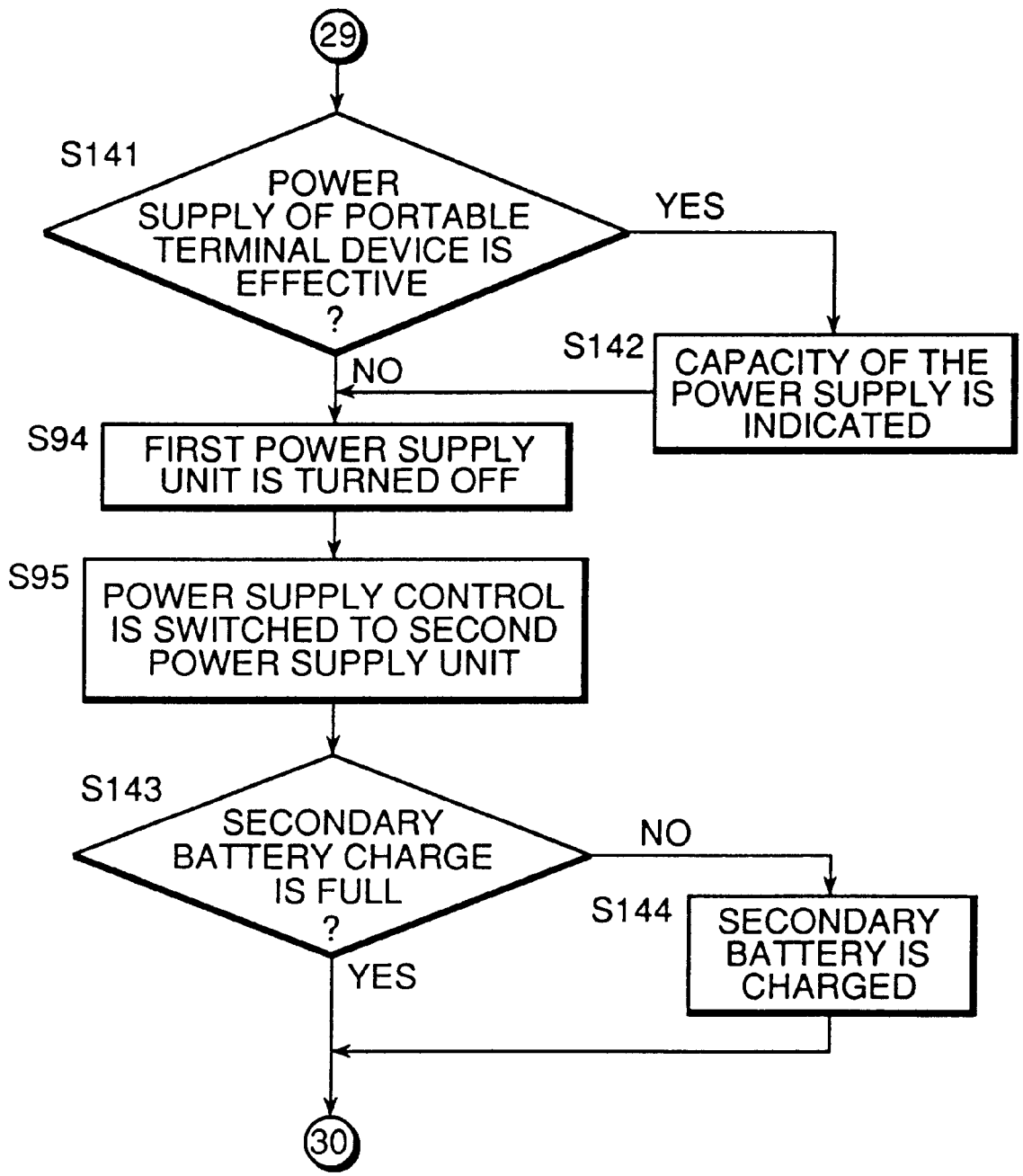
Figure 28:
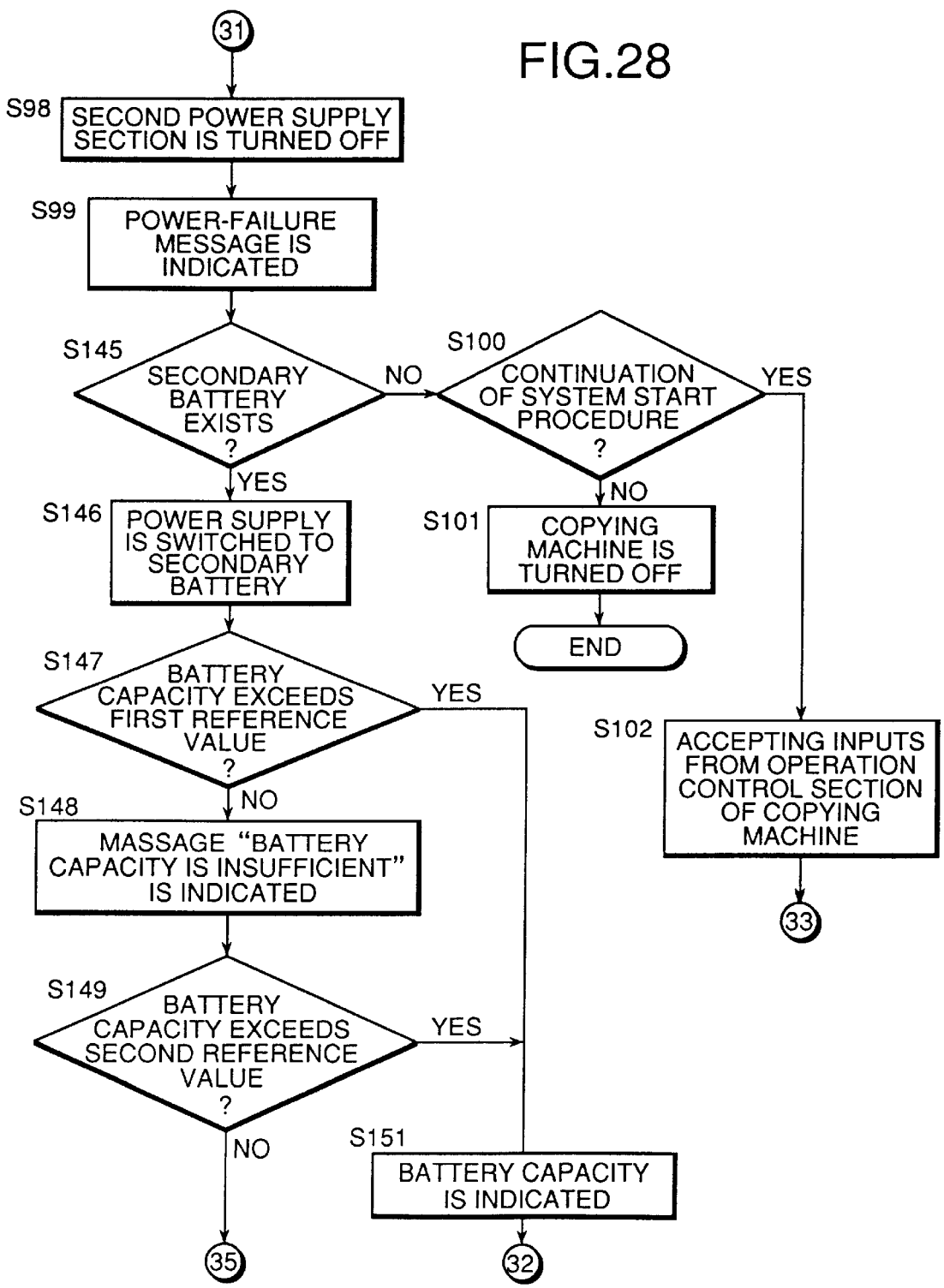
FIGS. 28 and 29 are continuation of the flow charts of FIGS. 25, 26 and 27.
Figure 29:
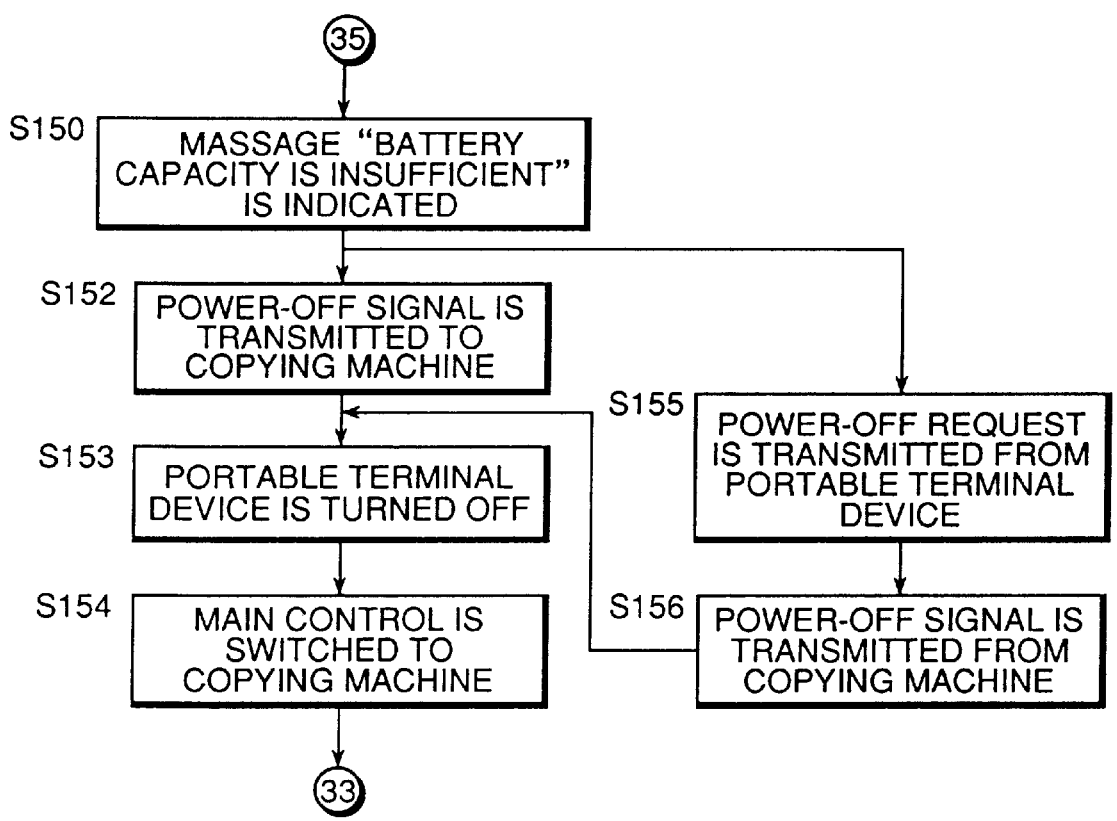
Figure 30:
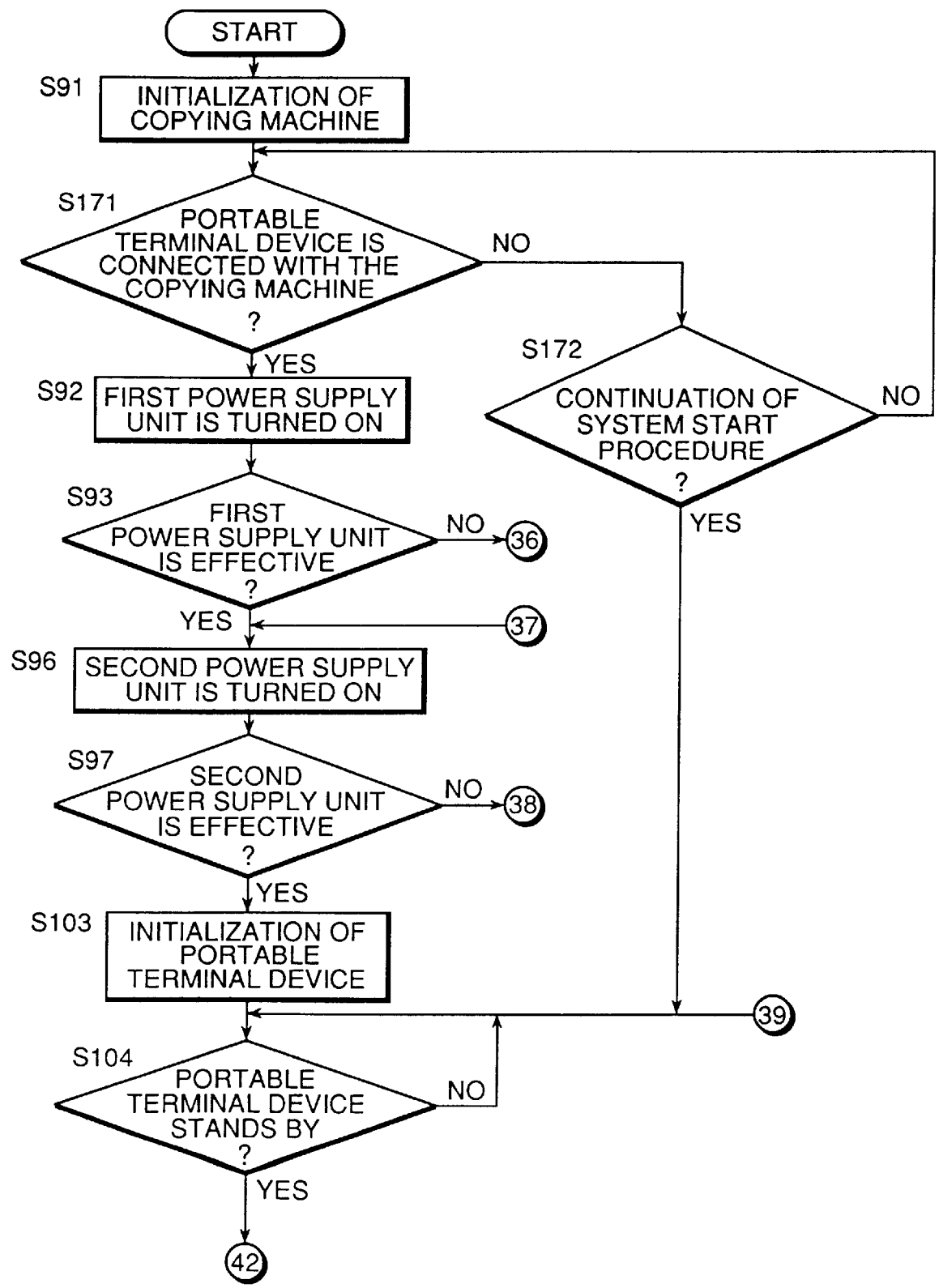
FIGS. 30, 31 and 32 are flow charts depicting the eighth example of a processing procedure of a control section to control a copying machine and a terminal device in a data-processing system embodying the present invention.
Figure 31:
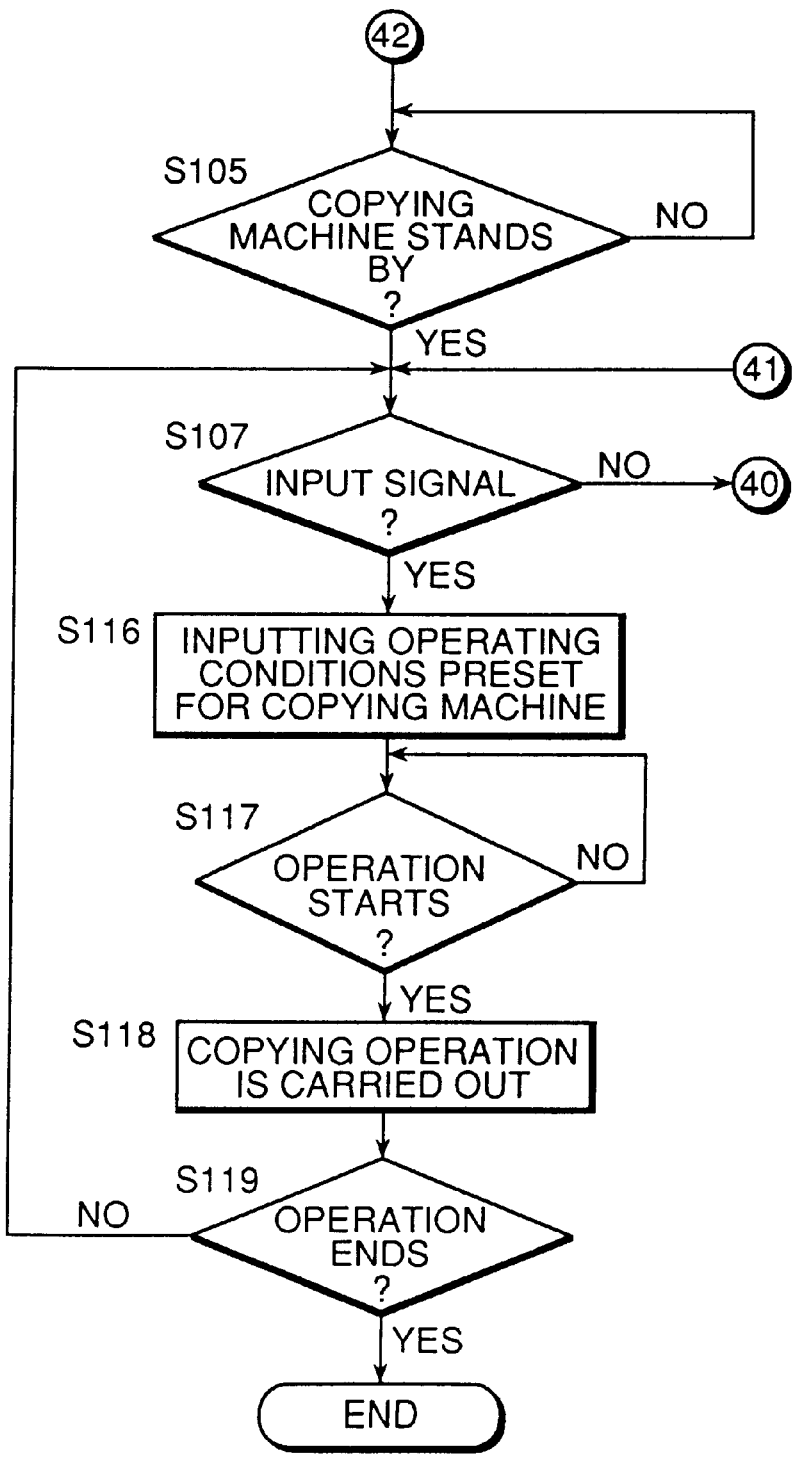
Figure 32:
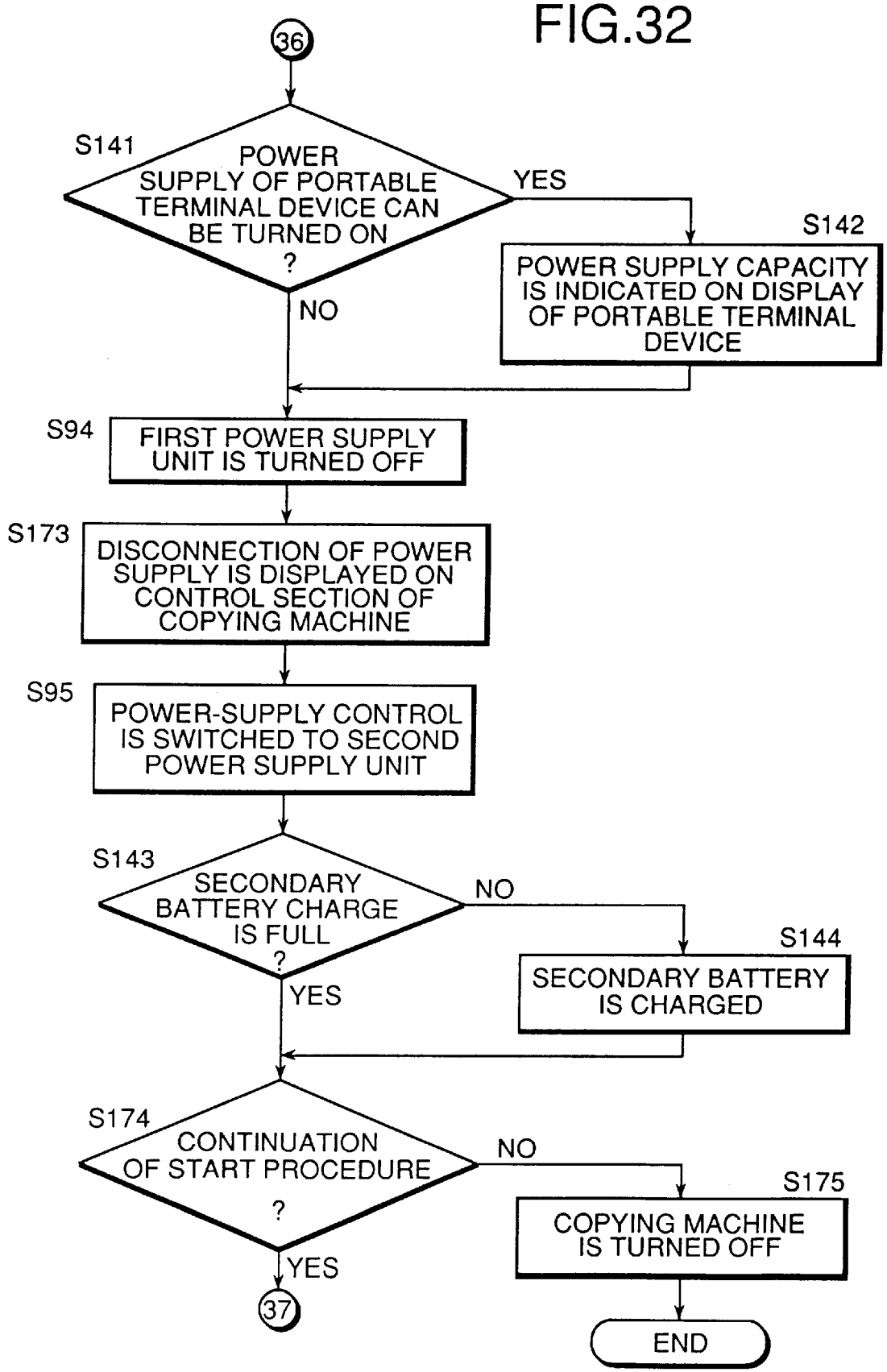
Figure 33:
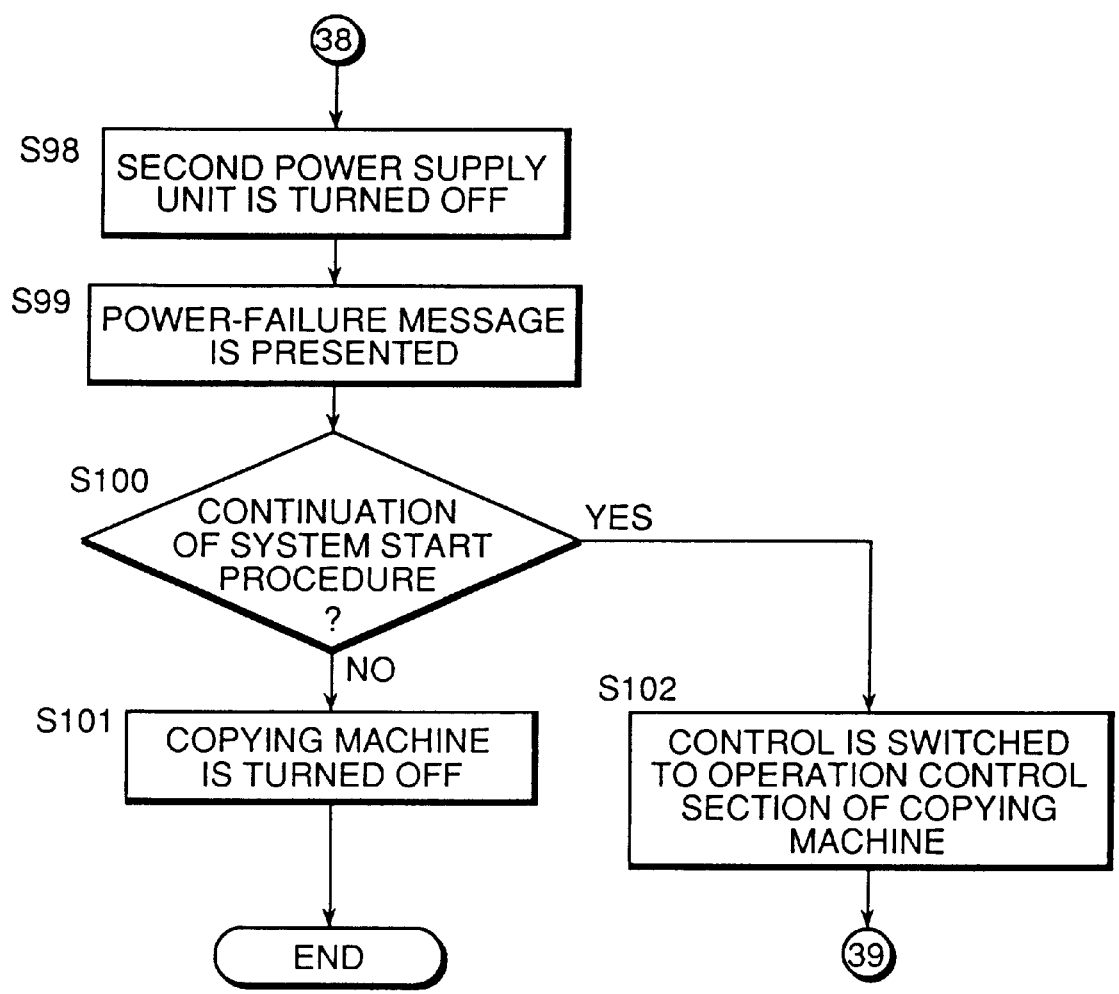

FIGS. 22, 23 and 24 are flow charts depicting the sixth exemplified procedure of the control sections of a copying machine and a portable terminal device, which compose a data processing system according to the present invention.

In this example, the copying machine 10 is provided with a power-cutoff timer for measuring a specified duration of time and forcibly turns off the power supply of the portable terminal device 80. In the system standing by after completion of processing steps s91 to s106 (FIGS. 19 and 20), the CPU 54 of the terminal device 80 transmits a signal of resetting the power-cutoff timer to the central processing unit 44 of the copying machine 10 at a specified interval (Step s121).

Until the limit time preset on the power-cutoff timer, the central processing unit 44 of the copying machine 10 waits for transmission of a power-cutoff-timer resetting signal from the portable terminal device 80 (Steps s122 and s123). Upon receipt of the signal, the central processing unit 44 transmits a response signal to the portable terminal device 80 (Step s124). The CPU 54 of the portable terminal device 80 waits for the response signal from the copying machine 10 within a specified period (Steps s125 and s126). If no response arrived within the specified period, the CPU 54 indicates a power-failure message on the display 82 (Step s127), stores the data and then stops the processing (Step s128). When the response signal arrives within the specified period, the CPU 54 of the portable terminal device 80 transmits the data to reset the power-cutoff timer to the copying machine and returns to the waiting state (Step s129→Step s107).

When no resetting signal has been received until the limit time preset on the power-cutoff timer, the central processing unit 44 of the copying machine 10 checks whether the restart processing has been already made or not (Step s130). If not, the central processing unit 44 transmits a restart signal to the portable terminal device 80 (Step s131). Upon receipt of the restart signal from the copying machine 10, the CPU 54 of the portable terminal device 80 stores the data in a shelter and then performs the restart processing (Step s132). If the restart processing has been made, the central processing unit 44 of the copying machine 10 judges that the portable terminal device 80 could not restore itself into the normal state after restart processing. In this case, the central processing unit 44 waits until the portable terminal device 80 stores the current data, and then shuts off the power supply of the portable terminal device 80 (Step s133). When a specified interval of time has passed, the central processing unit 44 restarts the processing by turning on the power supply of the portable terminal device 80 (Step s134→Step s92).

A signal is inputted into the standing-by data-processing system. The central processing unit 44 resets the power-cutoff timer (Step s115) and accepts inputting of copying condition data through the touch panel 81 of the portable terminal device 80 or the operation panel 100 of the copying machine 10 (Step s116). When the user pressed the start key 93, the central processing unit 44 performs the copying procedure according to the preset copying conditions (Steps s117 and s118). On completion of the copying procedure, the central processing unit 44 returns to the waiting state (Step s119→Step s107).

The above procedure controls the correct state of two-way communication between the copying machine 10 and the copying machine and performs restarting of the portable terminal device 80 or turning-off of the power supply thereto if the communication is incorrect even in one way, thus preventing the erroneous operation of the copying machine 10 by using the data-processing system in the state in which data can not correctly exchanged between the copying machine 10 and the portable terminal device 80.

FIGS. 25 to 29 are flow charts depicting the seventh exemplified procedure of the control sections of a copying machine and a portable terminal device, which compose a data processing system according to the present invention. When the user turned on the power supply of the copying machine 10 with the portable terminal device mounted on the operation panel 100 thereof, the central processing unit 44 in the initialization mode of the copying machine 10 turns on the power supply of the portable terminal device 80 by supplying electric energy thereto from the first power supply unit 88 (Steps s91 and s92).

The central processing unit 44 checks whether the first power-supply unit 88 normally works by supplying the electric power to the portable terminal device 80 (Step s93). If not, the central processing unit 44 checks whether the portable terminal device 80 is energized (Step s141). If the terminal device 80 is energized, the central processing unit 44 judges that the terminal device 80 is energized from the battery incorporated therein, and requires the terminal device 80 to indicate the capacity of the internal battery on the display 82 (Step s142). The battery may be rechargeable as described before (batteries 86*a* and 86*b*).

The central processing unit 44 then turns off the power supply line from the first power-supply unit 88 (Step s94) and supplies the portable terminal device 80 with electric power from the second power-supply unit 88 (Step s95). When the terminal device is not energized, the central processing unit 44 directly starts the processing steps s94 and s95.

Furthermore, the central processing unit 44 can recharge the internal battery of the portable terminal device 80 depending upon the indicated current capacity of the battery while the terminal device 80 is energized by the battery (Steps s143 and s144). The central processing unit 44 then examines whether the second power-supply unit 88 normally works by supplying electric current to the portable terminal device 80 (Step s97). If not, the central processing unit 44 shuts off the power supply line from the second power-supply unit 88 (Step s98), indicates a power-failure message on the display of the copying machine 10 (Step s99) and checks whether the portable terminal device 80 incorporates a power-supply battery (Step s145).

If no battery exists in the portable terminal device 80 and the user requires the continuation of energizing the system, the central processing unit 44 changes the current state of the system into the state allowing the user to input data by using only the operation panel 100 of the copying machine (Step s145→Step s10→Step s102). Upon receipt of the user's instruction for interrupting the energizing the system, the central processing unit 44 turns off the power supply of the copying machine 10 (Step s145→Step s100→Step s101). For the portable terminal device 80 incorporating a power-supply battery, the central processing unit 44 changes the power supply to the internal battery (Step s146) and compares the battery capacity with the first reference value and the second reference value (Steps s147 and s149). When the battery capacity meets with either the first or second reference value, the central processing unit 44 indicates the battery capacity on the display 82 and initializes the portable terminal device 80 (Step s151→Step s103).

The first reference value may be equal to, e.g., a half of the maximal capacity of the internal battery, which enables the terminal device to work for a short period. The second reference value may be equal to, e.g., a quarter of the maximal battery capacity, which is insufficient for use of the terminal device 80 in the system. These reference values may be preset by the user.

If the battery did not satisfy the first or second reference, the central processing unit 44 indicates a message "the battery capacity is insufficient" on the display 82 of the portable terminal device 80 (Steps s148 and s150). If the battery did not satisfy the second reference, the CPU 54 of the portable terminal device 80 transmits a signal for execution of power-cutoff processing to the copying machine 10 and executes the turning-off of the power supply (Steps s152 and s153). The central processing unit 44 then switches the control mode to the operation panel mode in which the user can input setting and control data through only the operation panel 100 of the copying machine 10 (Step s154).

It is also possible that a request for turning-off the power supply is transmitted from the portable terminal device 80 to the copying machine 10 and a command for turning-off the power supply is transmitted from the copying machine 10 to the portable terminal device 80 by performing Steps s155 and s156 instead of Step s152.

The portable terminal device 80 is initialized if it is normally powered from either the first or second power-supply unit 88 (Step s103). After initialization of the terminal device 80 and the copying machine 10 (Steps s104 and s105), the system waits for an input signal (Step s107). In the waiting state of the system, the data processing system accepts input data on preset copying conditions through the touch panel 81 of the portable terminal device 80 or the operation panel 100 of the copying machine 10 (Step s116). When the user pressed the start key 93, the system performs the copying process according to the preset copying conditions (Steps s117 and s118) and then returns to a waiting state for the next cycle (Step s157→Step s107).

The sub-power-supply unit in the copying machine 10 is turned on (Step s158) and executing processing steps for turning-off of the copying machine 10 and the portable terminal device 80 are executed (Step s159) for ending the operation of the data-processing system. The internal battery of the portable terminal device 80 is charged from the sub-power-supply unit of the copying machine (Step s160). On completion of charging the internal battery of the portable terminal device 80 (Step s161), the sub-power-supply unit is turned off according to the user's instruction (Step s163) and the power supply of the portable terminal device is also turned off (Step s164).

The above-described procedure makes it possible to operate the data-processing system by using the internal battery of the portable terminal device 80 even if the portable terminal device 80 cannot be powered from the copying machine 10. The indication of the battery capacity on the display 82 enables the user to easily decide how long the system can be used on the battery. Furthermore, the battery in the portable terminal device 80 can be recharged from the sub-power-supply unit of the copying machine after the system operation end. After recharging the battery, the sub power-supply unit can be further used for preheating the copying machine 10 at saved power consumption.

FIGS. 30 to 34 are flow charts depicting the eighth exemplified procedure of the control sections of a copying machine and a portable terminal device, which compose a data processing system according to the present invention. The user turns on the power supply of the copying machine 10 with the portable terminal device mounted on the operation panel 100 thereof (Step s91). The central processing unit 44 first checks whether the portable terminal device 80 is attached to the copying machine 10 (Step s171). The central processing unit 44 judges whether the copying machine 10 can be used without the portable terminal device 80 if the terminal device 80 is not mounted on the copying machine (Step s172). When the copying machine 10 has the terminal device 80 mounted thereon, the central processing unit 44 energizes the terminal device 80 by supplying electric energy thereto from the first power-supply unit 88 (Step s92).

The central processing unit 44 checks whether the first power-supply unit 88 normally works by supplying electric power to the portable terminal device 80 (Step s93). If not, the central processing unit 44 checks whether the portable terminal device 80 is energized or not (Step s141). If so, the central processing unit 44 judges the portable terminal device 80 being energized from the battery incorporated therein and requires the terminal device to indicate the battery capacity on the display 82 (Step s142). The central processing unit 44 then shuts off the power supply line from the first power-supply unit 88 (Step s94), presents a message <the power supply is disconnected from the portable terminal device 80> on the display of the copying machine 10 (Step s173) and supplies the portable terminal device 80 with electric power from the second power-supply unit 88 (Step s95). The central processing unit 44 performs processing steps s94 and s95 when the terminal device 80 was found as not energized. When the terminal device 80 is powered by the battery, the central processing unit 44 causes the battery to be recharged depending upon the capacity of the battery (Steps s143 and s144).

The central processing unit 44 checks whether the second power-supply unit 88 normally works by supplying electric power to the terminal device 80 (Step s97). If not, the central processing unit 44 shuts off the power supply line from the second power-supply unit 88 (Step s98), indicates a power-failure message on a display of the copying machine 10 (Step s99) and, on the user's request for energizing the system, switches the input mode to the operation panel mode in which the user can input data by using only the operation panel 100 of the copying machine (Step s100→Step s102). Upon receipt of the user's instruction for interrupting the system starting procedure, the central processing unit 44 turns off the power supply of the copying machine 10 (Step s100→Step s101).

The portable terminal device 80 is initialized while it is normally energized by the first or second power-supply unit 88 (Step s103). After initialization of the terminal device 80 and the copying machine 10 (Steps s104 and s105), the system waits in a state of readiness for an input signal (Step s107).

In a waiting state until a signal is inputted, the central processing unit 44 checks whether the portable terminal device 80 is attached to the copying machine 10 (Step s176). If not, the central processing unit 44 transmits a power-off command to the portable terminal device 80 (Step s177) and checks whether the power-off command is received by the terminal device 80 within a specified period (Steps s178 and s180). On receipt of the power-off command, the CPU 54 of the portable terminal device 80 stores data in a memory (Step s179) and indicates a message <the power-supply switch 83 must not be operated until data is stored> on the display 82 (Step s182). The capacity of the internal battery is also shown on the display 82 when the battery is incorporated in the portable terminal device 80 (Steps s183 and s184).

When the terminal device 80 completed sheltering all data or could not receive the power-off command within the specified period, the central processing unit 44 of the copying machine 10 outputs a power-failure message on the display of the operation panel 100 (Step s181), turns off the power supply to the terminal device 80 (Step s185) and switches to the operation panel mode in which the user can input data through only the operation panel 100 of the copying machine 10 (Step s186).

The data-processing system in a waiting state receives an input signal and starts accepting of the copying condition data preset and input from the touch control panel 81 of the terminal device 80 or the operation panel 100 of the copying machine 10 (Step s116). The user presses the start key 93, and the system then performs the copying processing operation according to the preset copying conditions (Steps s117 and s118). On completion of the copying operation, the system returns to the waiting state.

The above-described procedure makes it possible to reliably prevent erroneous operation of the copying machine 10 and breakage of the system by checking the state of mounting the portable terminal device 80 on the copying machine 10 before and after initializing the portable terminal device 80, checking the presence of the portable terminal device 80 when driving the system and checking the disconnection of the portable terminal device 80 from the copying machine 10 after energizing the system. The central processing unit 44 of the copying machine 10 executes the initialization of the portable terminal device 80 after checking normal mounting of the device 80 on the copying machine 10. This enables mounting of the portable terminal device 80 on the copying machine 10 after energizing the latter. In this instance, the portable terminal device 80 can be attached to the copying machine with no need of re-energizing the latter, assuring effective use of the system. The mounted state of the portable terminal device 80 and the state of power-supply to the same can be checked after energization of the system and messages corresponding to detected troubles are indicated. This enables the user to correctly restore the system.

As is apparent from the foregoing, the present invention offers the following advantages:

A data-processing system according to an aspect of the present invention can work correctly and reliably since the first data processing device connected to the second data processing device can not be deenergized by a power-saving function when the first data-processing device did not receive an input of processing data within a specified period. In the other words, the system can be free from such a trouble that sudden interruption takes place in power supply of the first data processing device.

A data-processing system according to another aspect of the present invention can be quickly initialized and can work by executing only necessary programs since unnecessary programs stored in the first data-processing device connected with the second data-processing device are inhibited to run.

A data-processing system according to another aspect of the present invention can be operated easily and correctly since ones of same-functional inputting members on the first data-processing device and the second data-processing device are selected to use and the others are inhibited to use to eliminate the possibility of inputting data two times from the same-functional members. This may prevent occurrence of erroneous operation of the system due to the doubled input data.

A data-processing system according to another aspect of the present invention can energize the first data-processing device from either internal power-supply of the first data-processing device or power supply section of the second data-processing device, which can be suitably selected according to the result of checking the state of power supply from the second data-processing device. This may improve the efficiency of the data-processing system.

A data-processing system according to another aspect of the present invention can recharge the internal battery of the first data-processing device from the power-supply section of the second data-processing device while both data processing devices are interconnected to form a single data-processing system. The first data-processing device can be used separately on the recharged battery. This can improve the efficiency of the first data-processing device.

A data-processing system according to another aspect of the present invention can cause the first data-processing device to turn off the power supply according to a power-off command from the second data-processing device when the first data-processing device is released from the connection with the second data-processing device. Namely, the first data-processing device disconnects itself from the second data processing device not to accept input processing data in the event of incorrect connection between both data-processing devices.

What is claimed is:

1. A data processing system for transmitting data between a first data-processing device for accepting operation of inputting processing data and a second data-processing device for executing processing according to the processing data, wherein the first data-processing device is provided with a power saving function for disconnecting a power supply when input waiting time of the first data-processing device exceeds a specified time and a function for inactivating the power saving function while the first and second data-processing devices are coupled with each other.

2. A data processing system as defined in claim 1, wherein the first data-processing device is provided with an internal power supply source, the second data-processing device is provided with one or a plurality of power supply portions to supply for the first data-processing device, and the first data-processing device is supplied with power from either of the internal power supply or any one of the power supply portions based upon a detected state for the first data-processing device.

3. A data processing system as defined in claim 1, wherein the second data-processing device can detect a state of connection between the first and second data-processing devices and provides the first data-processing device with a signal for switching off the power-supply when the connection is removed.

4. A data processing system for transmitting data between a first data-processing device for accepting operation of inputting processing data and a second data-processing device for executing processing according to the processing data, wherein the first data-processing device is provided with a power saving function for disconnecting a power supply when input waiting time of the first data-processing device exceeds a specified time and a function for inactivating the power saving function while the first and second data-processing devices are coupled with each other, and further wherein the first data-processing device stores a plurality of programs relating the operation of inputting processing data and a part of the plural programs is inhibited to execute while the first and second data-processing devices are connected with each other.

5. A data processing system for transmitting data between a first data-processing device for accepting operation of inputting processing data and a second data-processing device for executing processing according to the processing data, wherein the first data-processing device is provided with a power saving function for disconnecting a power supply when input waiting time of the first data-processing device exceeds a specified time and a function for inactivating the power saving function while the first and second data-processing devices are coupled with each other, and further wherein the second data-processing device is provided with a single or plural inputting members having functions common to the processing-data inputting members of the first data-processing device and operations of the common-function inputting members of either of the devices are only admitted while the first and second data-processing devices are connected with each other.

6. A data processing system for transmitting data between a first data-processing device for accepting operation of inputting processing data and a second data-processing device for executing processing according to the processing data, wherein the first data-processing device is provided with a power saving function for disconnecting a power supply when input waiting time of the first data-processing device exceeds a specified time and a function for inactivating the power saving function while the first and second data-processing devices are coupled with each other, and further the first data-processing device is provided with a rechargeable internal power-supply source that is recharged from the power supply portion of the second data-processing device while the first and second data-processing devices are connected with each other.

* * * * *